United States Patent
Lim et al.

(10) Patent No.: US 9,354,895 B2
(45) Date of Patent: May 31, 2016

(54) METHOD OF UPDATING BOOT IMAGE FOR FAST BOOTING AND IMAGE FORMING APPARATUS FOR PERFORMING THE SAME

(71) Applicant: Samsung Electronics Co., Ltd., Suwon-si (KR)

(72) Inventors: Kang-hee Lim, Suwon-si (KR); Joung-hoon Choo, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/056,404

(22) Filed: Oct. 17, 2013

(65) Prior Publication Data
US 2014/0129820 A1    May 8, 2014

(30) Foreign Application Priority Data
Nov. 6, 2012   (KR) ................. 10-2012-0125090

(51) Int. Cl.
*G06F 9/445* (2006.01)
*G06F 9/44* (2006.01)

(52) U.S. Cl.
CPC .............. *G06F 9/4401* (2013.01); *G06F 8/665* (2013.01); *G06F 9/4418* (2013.01)

(58) Field of Classification Search
CPC ... G06F 9/4418; G06F 9/4401; G06F 9/4406; G06F 21/575; G06F 8/65; G06F 8/67; G06F 9/45537; G06F 8/61; G06F 8/665
See application file for complete search history.

(56) References Cited

U.S. PATENT DOCUMENTS

| | | | |
|---|---|---|---|
| 5,325,532 A | 6/1994 | Crosswy et al. | |
| 5,519,869 A | 5/1996 | Payne et al. | |
| 5,557,777 A | 9/1996 | Culbert | |
| 5,933,631 A | 8/1999 | Mealey et al. | |
| 6,098,158 A * | 8/2000 | Lay et al. ................. | 711/162 |
| 6,507,881 B1 | 1/2003 | Chen | |
| 6,609,182 B1 | 8/2003 | Pedrizetti et al. | |
| 6,611,919 B1 | 8/2003 | Matsuya et al. | |
| 7,249,353 B2 * | 7/2007 | Zarco ................. | G06F 8/65 717/170 |
| 7,360,013 B2 | 4/2008 | Fujita et al. | |
| 8,341,385 B2 * | 12/2012 | Asai .................... | G06F 8/61 713/1 |
| 8,386,757 B1 | 2/2013 | Midgley et al. | |

(Continued)

FOREIGN PATENT DOCUMENTS

| | | |
|---|---|---|
| CN | 101515239 | 8/2009 |
| JP | 2003-84977 | 3/2003 |

(Continued)

OTHER PUBLICATIONS

Lee et al., Fast booting based on nand flash memory, Oct. 2012, 2 pages.*

(Continued)

*Primary Examiner* — Thuy Dao
(74) *Attorney, Agent, or Firm* — Staas & Halsey LLP

(57) ABSTRACT

An image forming apparatus for updating a boot image for fast booting includes an interface unit to receive a new version of firmware to update a previous version of firmware installed in the image forming apparatus, a non-volatile memory to store a first boot image that is a previous version for the fast booting, and a processor updating a boot image by controlling the stored first boot image to be replaced with a second boot image that is a new version when the received new version of firmware includes the second boot image.

19 Claims, 18 Drawing Sheets

(56) References Cited

U.S. PATENT DOCUMENTS

| | | | |
|---|---|---|---|
| 8,654,372 B2* | 2/2014 | Ukegawa | G06F 8/65 358/1.13 |
| 8,694,824 B2* | 4/2014 | Howard | G06F 9/4401 714/2 |
| 8,997,079 B2* | 3/2015 | Kuroki | G06F 8/665 717/168 |
| 2001/0039612 A1 | 11/2001 | Lee | |
| 2002/0016909 A1 | 2/2002 | Miyajima | |
| 2002/0073304 A1 | 6/2002 | Marsh et al. | |
| 2002/0078338 A1 | 6/2002 | Lay et al. | |
| 2003/0035140 A1* | 2/2003 | Tomita et al. | 358/1.15 |
| 2005/0015582 A1 | 1/2005 | Shida et al. | |
| 2005/0060531 A1 | 3/2005 | Davis et al. | |
| 2005/0090458 A1 | 4/2005 | Pitterna | |
| 2005/0193232 A1 | 9/2005 | Diehl | |
| 2006/0070055 A1* | 3/2006 | Hodder | G06F 8/65 717/168 |
| 2006/0218361 A1 | 9/2006 | Ehrlich et al. | |
| 2006/0282654 A1 | 12/2006 | Veen et al. | |
| 2007/0067679 A1 | 3/2007 | Deobald | |
| 2007/0124573 A1 | 5/2007 | Walker et al. | |
| 2007/0250730 A1 | 10/2007 | Reece et al. | |
| 2007/0260868 A1 | 11/2007 | Azzarello et al. | |
| 2008/0005541 A1 | 1/2008 | Hase et al. | |
| 2008/0091929 A1 | 4/2008 | Oberhaus et al. | |
| 2008/0316522 A1 | 12/2008 | Yokoyama et al. | |
| 2009/0178141 A1 | 7/2009 | Panasyuk | |
| 2009/0307480 A1 | 12/2009 | Katoh | |
| 2010/0037076 A1 | 2/2010 | Reece et al. | |
| 2010/0100719 A1 | 4/2010 | Chen et al. | |
| 2010/0174934 A1 | 7/2010 | Zhao et al. | |
| 2011/0055541 A1 | 3/2011 | Lee et al. | |
| 2011/0213954 A1 | 9/2011 | Baik et al. | |
| 2011/0239208 A1* | 9/2011 | Jung et al. | 717/170 |
| 2011/0246715 A1 | 10/2011 | Doran et al. | |
| 2012/0066546 A1* | 3/2012 | Kim | 714/15 |
| 2012/0072897 A1* | 3/2012 | Selvam | 717/171 |
| 2012/0210115 A1* | 8/2012 | Park | H04L 9/3242 713/2 |
| 2013/0036300 A1 | 2/2013 | Baik et al. | |
| 2013/0042097 A1 | 2/2013 | Baik et al. | |
| 2013/0042098 A1 | 2/2013 | Baik et al. | |
| 2013/0074060 A1* | 3/2013 | Kim | G06F 9/485 717/168 |
| 2014/0129820 A1 | 5/2014 | Lim et al. | |

FOREIGN PATENT DOCUMENTS

| | | |
|---|---|---|
| JP | 2007-293401 | 11/2007 |
| JP | 2008-165554 | 7/2008 |
| JP | 2009-193379 | 8/2009 |
| KR | 10-1999-0011346 | 2/1999 |
| KR | 10-2001-0053904 | 7/2001 |
| WO | 94/08288 | 4/1994 |

OTHER PUBLICATIONS

Singh et al., Optimizing the boot time of Android on embedded system, 2011, 6 pages.*
US Office Action issued Mar. 10, 2014 in U.S. Appl. No. 13/036,865.
Hiroki Kaminaga, "Improving Linux Startup Time Using Software Resume (and other techniques)" Jul. 2006.
International Search Report and Written Opinion of the International Searching Authority mailed Feb. 28, 2013 issued in International Patent Application No. PCT/KR2012/007439.
International Search Report and Written Opinion of the International Searching Authority mailed Sep. 29, 2011 issued in International Patent Application No. PCT/KR2011/001362.
US Office Action mailed Jul. 11, 2013 in U.S. Appl. No. 13/036,865.
US Office Action mailed Sep. 26, 2013 in U.S. Appl. No. 13/036,865.
U.S. Appl. No. 13/036,865, filed Feb. 28, 2011, Kun-hoon Baik et al., Samsung Electronics Co., Ltd.
U.S. Appl. No. 13/650,752, filed Oct. 12, 2012, Kun-hoon Baik et al., Samsung Electronics Co., Ltd.
U.S. Appl. No. 13/650,715, filed Oct. 12, 2012, Kun-hoon Baik et al., Samsung Electronics Co., Ltd.
U.S. Appl. No. 13/650,727, filed Oct. 12, 2012, Kun-hoon Baik et al., Samsung Electronics Co., Ltd.
European Examination Report dated Mar. 5, 2014 in European Patent Application No. 13187539.5.
European Search Report dated Feb. 20, 2014 in European Patent Application No. 13187539.5.
Kunhoon Baik et al., "Boosting up Embedded Linux device: experience on Linux-based Smartphone", Proceedings of the Linux Symposium, 2010, 12 pages.
US Advisory Action issued May 20, 2014 in U.S. Appl. No. 13/036,865.
US Office Action issued Jun. 18, 2014 in U.S. Appl. No. 13/036,865.
US Office Action issued Jan. 2, 2015 in U.S. Appl. No. 13/650,715.
Extended European Search Report dated Sep. 4, 2014 in European Application No. 11747750.5.
Chinese Office Action issued Jul. 29, 2014 in Chinese Patent Application No. 201180010999.2.
US Office Action issued Oct. 20, 2014 in U.S. Appl. No. 13/036,865.
Tim R. Bird, "Methods to Improve Bootup Time in Linux," In Proc. of the Linux Symposium, 2004, 12 pages.
A. Leonard Brown, et al. "Suspend-to-RAM in Linux," In Proc. of the Linux Symposium, 2008, 16 pages.
Heeseung Jo, et al. "Improving the Startup Time of Digital TV," IEEE Transactions on Consumer Electronics, vol. 52, Issue 2, May 2009, 7 pages.
Kunhoon Baik, et al. "Boosting up Embedded Linux device: experience on Linux-based Smartphone", Proc. of the Linux Symposium, 2010, 12 pages.
CELF—Boot Time, http://eLinux.org/Boot\_Time, Last modified 2014, 9 pages.
Uncompressed Kernel, http://elinux.org/Uncompressed\_kernel, Last modified 2011, 1 page.
Fast Kernel Decompression, http://elinux.org/Fast\_Kernel\_Decompression, Last modified 2011, 4 pages.
Disable console, http://elinux.org/Disable\_Console, Last modified 2008, 3 pages.
Preset LPJ, http://elinux.org/Preset\_LPJ, Last modified 2008, 5 pages.
Deferred Initcalls, http://elinux.org/Deferred\_Initcalls, Last modified 2013, 3 pages.
UBI—Unsorted Block Images, http://www.linux-mtdinfradead.org/doc/ubi.html, Last modified 2009, 13 pages.
UBIFS—UBI File-System, http://www.linux-mtd.infradead.org/doc/ubifs.html, Last modified 2008, 15 pages.
UCL, http://www.oberhumer.com/opensource/ucl/, Version 1.03, Last modified 2004, 1 pages.
US Office Action issued Mar. 2, 2015 in U.S. Appl. No. 13/036,865.
US Office Action issued Mar. 18, 2015 in U.S. Appl. No. 13/650,727.
Japanese Office Action issued Feb. 9, 2015 in Japanese Patent Application No. 2012-554941.
US Restriction Requirement issued Apr. 14, 2015 in U.S. Appl. No. 13/650,752.
US Office Action issued Jun. 10, 2015 in U.S. Appl. No. 13/650,715.
US Office Action issued Jul. 6, 2015 in U.S. Appl. No. 13/650,727.
US Office Action issued Jul. 8, 2015 in U.S. Appl. No. 13/650,752.
US Office Action dated Nov. 30, 2015 in U.S. Appl. No. 13/650,752.
US Office Action dated Dec. 1, 2015 in U.S. Appl. No. 13/650,715.
US Amendment as filed Sep. 9, 2015 in U.S. Appl. No. 13/650,715.
Korean Office Action dated Dec. 17, 2015 in Korean Patent Application No. 10-2010-0018237.
US Office Action dated Mar. 30, 2016 in U.S. Appl. No. 13/650,715.

* cited by examiner

< BEFORE F/W UPDATE (1701) >

< AFTER F/W UPDATE (1702) >

METHOD OF UPDATING BOOT IMAGE FOR FAST BOOTING AND IMAGE FORMING APPARATUS FOR PERFORMING THE SAME

CROSS-REFERENCE TO RELATED APPLICATIONS

This application claims the priority benefit of Korean Patent Application No. 10-2012-0125090, filed on Nov. 6, 2012, in the Korean Intellectual Property Office, the disclosure of which is incorporated herein in its entirety by reference.

BACKGROUND

1. Field

Embodiments relate to a method of updating a boot image for fast booting and an image forming apparatus for performing the method.

2. Description of the Related Art

Recently, lots of functions of electronic products have been moved from hardware to software. This has been possible due to technical developments of hardware that reduced restrictions on software. However, as software provides various functions, the size of the software has increased and its process has become complicated. Although software has been efficiently developed by using various middleware, the system booting time or speed of an electronic product has slowed down due to use of various software. The system booting time varies according to the type of system. However, in personal computers or server systems, since the system booting time is considerably long due to loading of device drivers and system initialization, a large amount of energy or time is wasted. Also, the system booting speed has been problematic not only in personal computers or server systems but also in electronic products having diverse functions, such as digital televisions, mobile communication terminals, or navigation systems. The system booting time of recent electronic products ranges from tens of seconds to several minutes.

SUMMARY

In an aspect of one or more embodiments, there is provided a method of updating a boot image for fast booting and an image forming apparatus for performing the method.

In an aspect of one or more embodiments, there is provided a non-transitory computer-readable storage medium having stored thereon a program, which, when executed by a computer, performs methods of embodiments.

In an aspect of one or more embodiments, there is provided an image forming apparatus for updating a boot image for fast booting includes an interface unit (interface) to receive a new version of firmware to update a previous version of firmware installed in the image forming apparatus, a non-volatile memory to store a first boot image that is a previous version for the fast booting, and a processor updating a boot image by controlling the stored first boot image to be replaced with a second boot image that is a new version when the received new version of firmware includes the second boot image.

In an aspect of one or more embodiments, there is provided a method of updating a boot image for fast booting of an image forming apparatus includes receiving a new version of firmware to update a previous version of firmware installed in the image forming apparatus, determining whether the received new version of firmware includes a second boot image that is a new version to update a first boot image that is a previous version that is stored in a non-volatile memory, and if the received new version of firmware includes the second boot image, updating a boot image by controlling the stored first boot image to be replaced with the second boot image.

In an aspect of one or more embodiments, there is provided a non-transitory computer-readable recording medium having recorded thereon a program for executing methods of embodiments.

In an aspect of one or more embodiments, there is provided an image forming apparatus including a non-volatile memory to store a first boot image; an interface to receive a new version of firmware to update a previous version of firmware installed in the image forming apparatus, the previous version of firmware including the first boot image; and a processor to update the first boot image with the second boot image by controlling the stored first boot image to be replaced with a second boot image if the received new version of firmware includes the second boot image.

In an aspect of one or more embodiments, there is provided a method of updating a boot image for fast booting of an image forming apparatus, the method including receiving a new version of firmware to update a previous version of firmware installed in the image forming apparatus; determining whether the received new version of firmware includes a second boot image which is different from a first boot image, which is stored in a non-volatile memory; and if the received new version of firmware includes the second boot image, updating the boot image for fast booting of the image forming apparatus by controlling the stored first boot image to be replaced with the second boot image.

In an aspect of one or more embodiments, there is provided at least one computer readable medium storing computer readable instructions to implement methods of embodiments.

BRIEF DESCRIPTION OF THE DRAWINGS

The above and other features and advantages will become more apparent by describing in detail embodiments thereof with reference to the attached drawings in which.

DETAILED DESCRIPTION

Figure 1A:
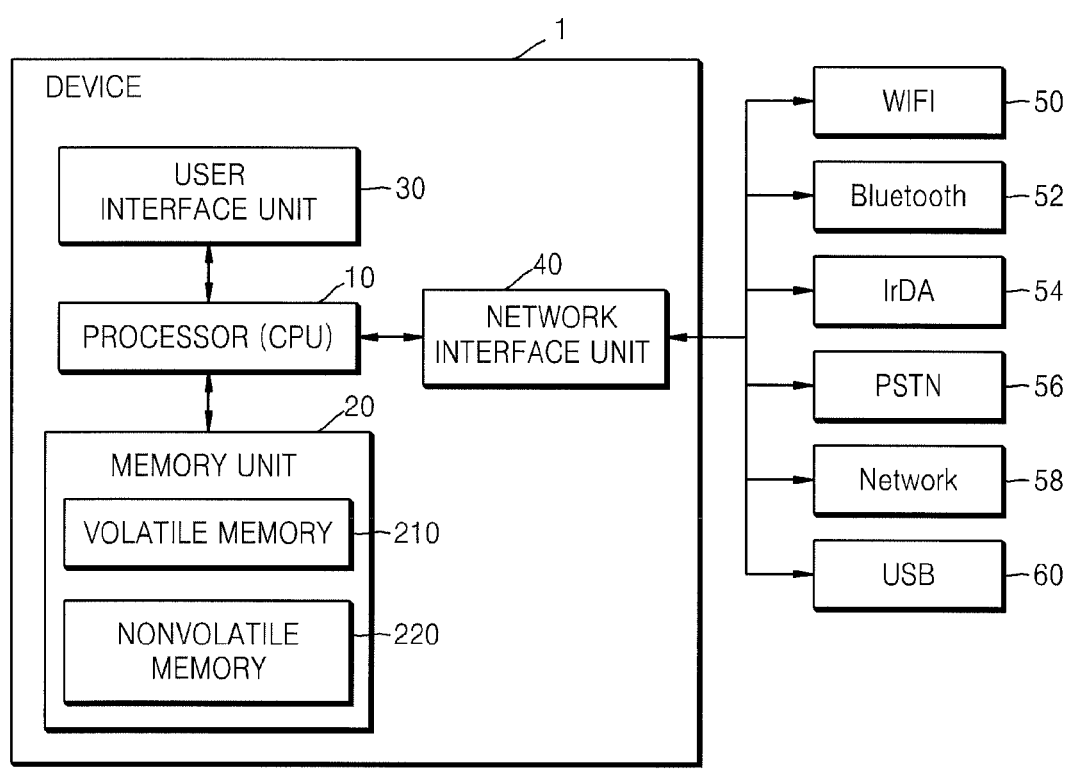
FIG. 1A is a block diagram schematically illustrating a structure of a device according to an embodiment.

The attached drawings for illustrating embodiments are referred to in order to gain a sufficient understanding of the disclosure, the merits thereof, and the objectives accomplished by the implementation of the disclosure. Hereinafter, embodiments will be described in detail with reference to the attached drawings. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list FIG. 1A is a block diagram schematically illustrating a structure of a device 1 according to an embodiment. Referring to FIG. 1A, the device 1 includes a processor 10, a memory unit (a memory) 20, a user interface unit (user interface) 30, and a network interface unit (a network interface) 40.

In FIG. 1A, hardware components related to an embodiment are illustrated. However, one of ordinary skill in the art would understand that an embodiment shown in FIG. 1A is not limited to these hardware components and that other hardware components may be included in addition to the hardware components shown in FIG. 1A or substituted for hardware components shown in FIG. 1A.

In an embodiment, the device 1 includes a mobile device such as a phone, tablet, or a personal data assistant (PDA), or a type of computing device, such as a computer or a notebook, which is generally used. Also, the device 1 may include an embedded device.

Figure 1B:
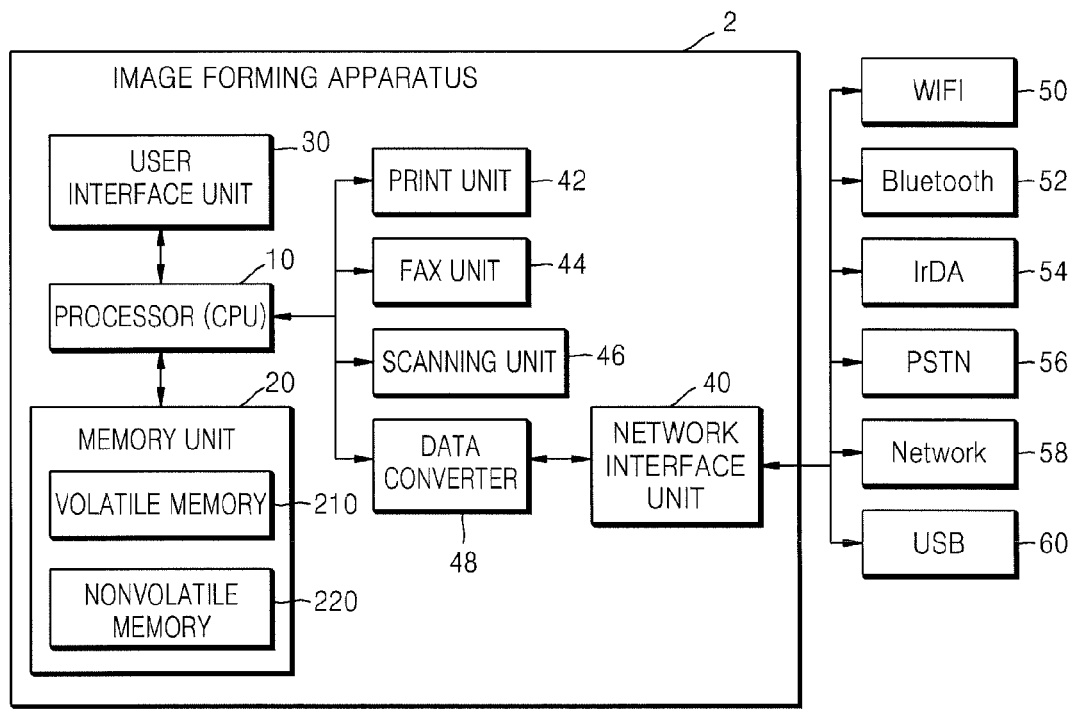
FIG. 1B is a block diagram schematically illustrating a structure of an image forming apparatus according to an embodiment.

FIG. 1B is a block diagram schematically illustrating a structure of an image forming apparatus 2 according to an embodiment. Referring to FIG. 1B, the image forming apparatus 2 includes the processor 10, the memory unit (memory) 20, the user interface unit (user interface) 30, the network interface unit (network interface) 40, a printing unit (printer) 42, a fax unit 44, a scanning unit (scanner) 46, and a data conversion unit (data converter) 48. One of ordinary skill in the art would understand that an embodiment shown in FIG. 1B is not limited to these hardware components and that other hardware components may be included in addition to the hardware components shown in FIG. 1B or substituted for hardware components shown in FIG. 1B.

Referring to FIG. 1B, the image forming apparatus 2, as an example of the device 1 of FIG. 1A, includes the processor 10, the memory unit 20, the user interface unit 30, and the network interface unit 40, which are common components having functions similar to those of the device 1. Accordingly, in the following description, the processor 10, the memory unit 20, the user interface unit 30, and the network interface unit (network interface) 40 are described as the components of the image forming apparatus 2, but the description also applies to the device 1.

The image forming apparatus 2 according to the present embodiment includes a general multifunction printer (MFP) which may perform multiple functions, such as copying, printing, scanning, fax transceiving, emailing, etc. in one device. Although in the following description, the image forming apparatus 2 is described as an MFP, the image forming apparatus 2 according to the present embodiment is not limited thereto and may include a separate device such as a printer, a scanner, a fax machine, etc.

The processor 10 executes an operating system (OS) and application programs installed on the image forming apparatus 2 by using data stored in the memory unit 20. The processor 10 may be a central processing unit (CPU).

Figure 1C:
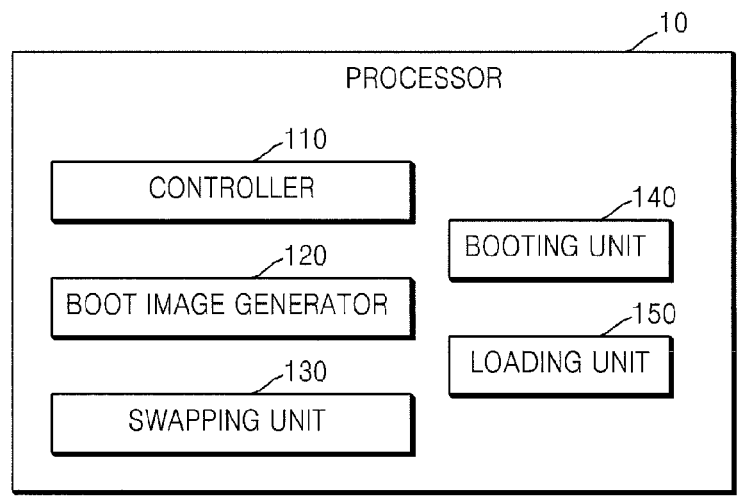
FIG. 1C is a block diagram schematically illustrating a structure of a processor according to an embodiment.

FIG. 1C is a block diagram schematically illustrating a structure of the processor 10 according to an embodiment. Referring to FIG. 1C, the processor 10 includes a control unit 110, a boot image generation unit 120, a swapping unit 130, a booting unit 140, and a loading unit 150. The processor 10 may be embodied by an array of a plurality of logic gates or by a common microprocessor. In other words, one of ordinary skill in the art would understand that the processor 10 may be embodied by a variety of types of hardware.

Referring back to FIG. 1A or 1B, the memory unit 20 includes a volatile memory 210 and a non-volatile memory 220. The volatile memory 210 is where data related to the OS and the application program executed by the image forming apparatus 20 is loaded so that the processor 10 may access and read out the data. The volatile memory 210 may be a random access memory (RAM) as a main memory.

The non-volatile memory 220, as a device for storing data for execution of the OS and the application program of the image forming apparatus 2, may be a memory that can retain the stored information even when not powered, for example, a hard disk drive, ferroelectric RAM (FRAM), magnetoresistive RAM (MRAM), or phase-change RAM (PRAM).

The user interface unit 30 receives information from a user using an information input device such as a keyboard, a mouse, hardware buttons, a touch screen such as a soft keyboard in a graphic user interface (GUI), or a speech recognition device. Also, the user interface unit 30 informs a user of the information processed by the image forming apparatus 2 by using a device for displaying visual information, for example, an LCD screen, an LED screen, or a grid display device, or a device for providing audible information, for example, a speaker.

The network interface unit 40 communicates with peripheral devices of the image forming apparatus 2, other external devices, or a network. For example, the image forming apparatus 2 may communicate with devices having functions such as WIFI 50, Bluetooth 52, etc., connect to a network 58, or communicate with peripheral devices such as a universal serial bus (USB) 60. The image forming apparatus 2 may communicate with an infrared data association (IrDa) network 54 or a public switch telephone network (PSTN) 56.

When power is applied, the image forming apparatus 2 automatically boots by using internal components such as the processor 10 and the memory unit 20. Furthermore, the image forming apparatus 2 according to the present embodiment may perform fast booting by using a boot image or booting through a process of generating a boot image.

The boot image is data including all necessary information for booting the image forming apparatus 2 to restore a system status at a particular time point when the boot image is generated, which may be generated as one file. In detail, the boot image is an image including data of a volatile memory and data of a CPU register, indicating information needed for a system state at the initial stage of booting of the image forming apparatus 2. The boot image according to the present embodiment may be alternatively referred to as a snapshot image.

Figure 2A:
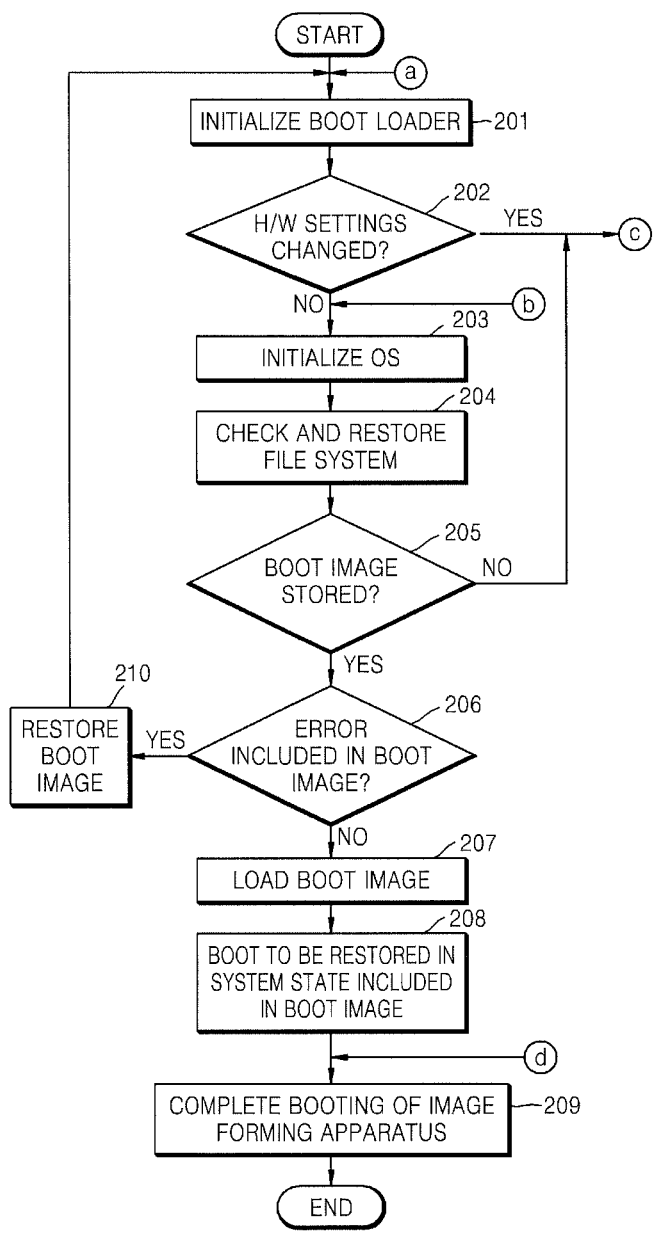
FIGS. 2A and 2B are a flowchart for explaining a method of booting an image forming apparatus, according to an embodiment.
Figure 2B:
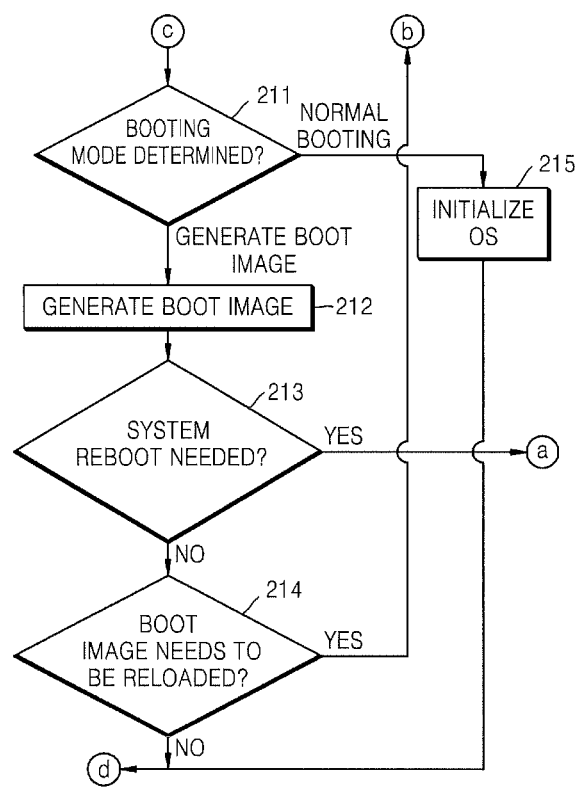

FIGS. 2A and 2B are flowcharts for explaining all booting methods of the image forming apparatus 2, according to an embodiment. Referring to FIGS. 2A and 2B, the booting method according to the present embodiment is a booting method performed by the image forming apparatus 2 of FIG. 1B.

In operation 201, when power is applied to the image forming apparatus 2, the processor 10 starts booting of the image forming apparatus 2 by initializing a bootloader. In operation 202, the processor 10 determines whether there is a change in settings of conventional hardware (H/W) such as the scanning unit 46, the facsimile unit 44, etc., of the image forming apparatus 2.

In operation 203, if it is determined in operation 202 that the settings of H/W are not changed, the processor 10 initializes an operating system (OS) of the image forming apparatus 2.

In operation 204, the processor 10 checks and restores a filesystem stored in the non-volatile memory 220. If the filesystem is found to have an error, the processor 10 restores the defective filesystem to a normal filesystem state.

In operation 205, the processor 10 determines whether a boot image is stored in the non-volatile memory 220.

In operation 206, if it is determined in operation 205 that a boot image is stored, the processor 10 checks whether there is an error in the stored boot image.

In operation 207, if it is found in operation 206 that no error exists in the stored boot image, the boot image stored in the non-volatile memory 220 is loaded in the volatile memory 210.

In operation 208, the processor 10 boots the image forming apparatus 2 based on the loaded boot image to be restored in a system state included in the boot image.

In operation 209, the processor 10 completes the booting of the image forming apparatus 2.

In operation 210, if it is found in operation 206 that the stored boot image has an error, the processor 10 restores the stored boot image. After the stored boot image is restored, the processor 10 performs the method again from operation 201.

In operation 211, if it is determined in operation 202 that the settings of the H/W are changed, the processor 10 determines a booting mode of the image forming apparatus 2. The booting mode is any one of a normal booting mode and a boot image generation mode. The normal booting includes cold booting that is generally used.

The user interface unit 30 may display a screen for selecting a booting mode to a user and receive a user selection of the booting mode. As such, when the user selection of a booting mode is input through the user interface unit 30, the image forming apparatus 2 determines a booting mode based on an input mode. Also, according to another embodiment, the selection of a booting mode may be input by communicating through the network interface unit 40 with other external devices connected to the image forming apparatus 2 via a network.

In operation 212, if the booting mode is determined in a boot image generation mode in operation 211, the processor 10 generates a boot image.

In operation 213, the processor 10 determines whether system reboot is needed according to the state of the image forming apparatus 2. If it is determined that the system reboot is needed, the processor 10 performs again the operations from operation 201 after rebooting the system.

In operation 214, if it is determined in operation 213 that the system rebooting is not needed, the processor 10 determines whether to load the boot image again. If it is determined that the boot image needs to be loaded again, the processor 10 performs again the operations from operation 203. Otherwise, if it is determined that the boot image does not need to be loaded again, operation 209 is performed and the booting of the image forming apparatus 2 is completed.

In operation 215, if it is determined in operation 211 that the booting mode is normal booting, the OS is initialized. Then, operation 209 is performed and thus the booting of the image forming apparatus 2 is completed.

Consequently, according to FIGS. 2A and 2B, after being booted, the image forming apparatus 2 proceeds with any one of three booting modes of a fast booting mode according to operations 207 and 208, a boot image generation mode according to operation 212, and a normal booting mode according to operation 215.

The following description will discuss in detail a process of generating a boot image according to the boot image generation mode for fast booting and a process of performing fast booting.

Figure 3:
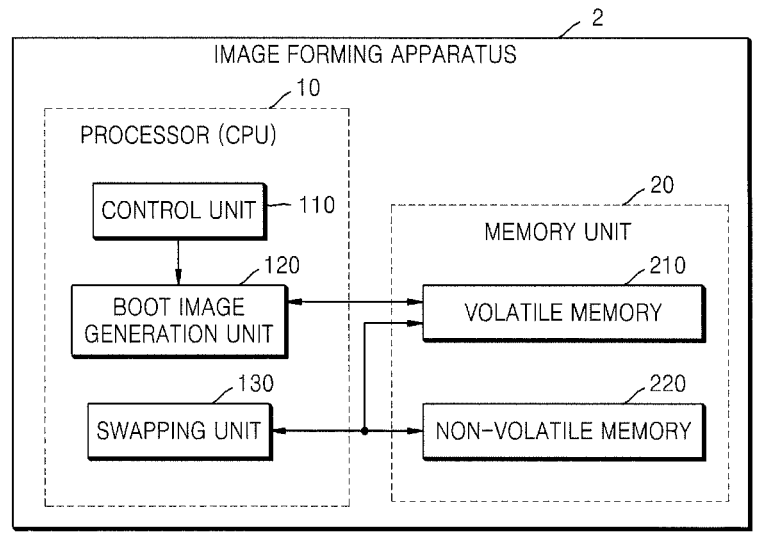
FIG. 3 is a block diagram schematically illustrating a structure of an image forming apparatus including a processor for generating a boot image, according to an embodiment.

FIG. 3 is a block diagram schematically illustrating a structure of the image forming apparatus 2 including the processor 10 for generating a boot image, according to an embodiment. Referring to FIG. 3, the image forming apparatus 2 includes the processor 10 and the memory unit 20 as illustrated in FIG. 1B. However, for convenience of explanation, the illustration of other components is omitted in FIG. 3. Also, one of ordinary skill in the art would understand that, among the components of the processor 10 of FIG. 1C, only the components related to the present embodiment are illustrated.

The processor 10 includes the control unit 110, the boot image generation unit 120, and the swapping unit 130. The memory unit 20 includes the volatile memory 210 and the non-volatile memory 220, as described in FIG. 1B.

Figure 4:
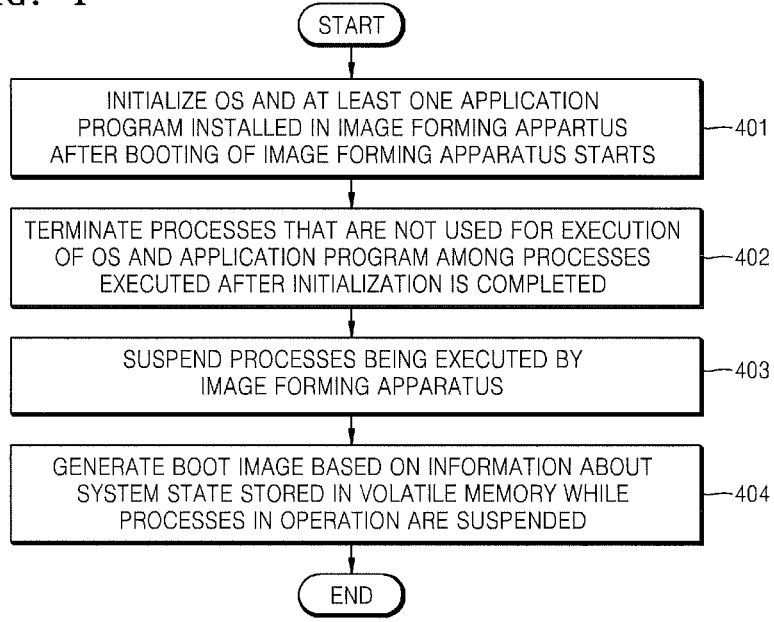
FIG. 4 is a flowchart for explaining a method of generating a boot image for fast booting of an image forming apparatus, according to an embodiment.

FIG. 4 is a flowchart for explaining a method of generating a boot image for fast booting of the image forming apparatus 2, according to an embodiment. Referring to FIG. 4, the method of generating a boot image is performed in a time series by the image forming apparatus 2 of FIG. 3. Accordingly, the method of generating a boot image will be described below with reference to FIGS. 3 and 4.

In operation 401, after the booting of the image forming apparatus 2 starts, the control unit 110 initializes an OS and at least one application program installed in the image forming apparatus 2.

In operation 402, the control unit 110 completes processes that are not used for execution of the OS and the application program, among the processes executed after the initialization is completed.

In operation 403, the control unit 110 suspends the processes being executed by the image forming apparatus 2.

In operation 404, while the processes in execution are suspended, the boot image generation unit 120 generates a boot image based on information about a system state stored in the volatile memory 210. The swapping unit 130 stores the generated boot image in the non-volatile memory 220.

Figure 5:
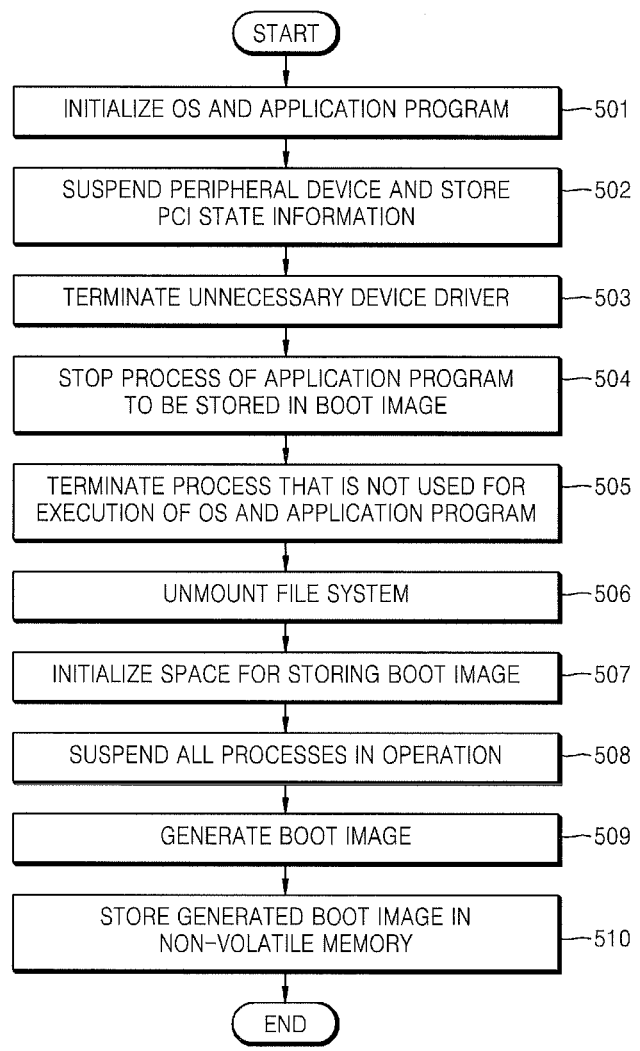
FIG. 5 is a flowchart for explaining, in detail, a method of generating a boot image for fast booting of an image forming apparatus, according to an embodiment.

FIG. 5 is a flowchart for explaining, in detail, a method of generating a boot image for fast booting of the image forming apparatus 2, according to an embodiment. The method of generating a boot image of FIG. 5 corresponds to a detailed version of the boot image generation method of FIG. 4.

In operation 501, after the booting of the image forming apparatus 2 starts, the control unit 110 initializes an OS and at least one application program installed in the image forming apparatus 2. The application program that is initialized signifies an application program that may operate a system, in addition to the OS. In the case of the image forming apparatus 2, at least one application program related to copying, printing, scanning, faxing, an address book, a document box, etc. is initialized. Data and thread of an application program are generated during the initialization process of the application program. During the initialization process of the application program, necessary pieces of information are loaded from a file, a database (DB), or a network socket in the volatile memory 210.

For example, when middleware such as Java is used, classes needed for use of the system are initialized altogether. However, for a system that is slow at the initial stage of execution like Java, important functions at the slow initial stage are initialized and stored in a boot image and thus the booting speed of Java after fast booting may be increase. This is because, for Java that is interpreting based middleware, interpreting and compiling are performed together when a first code is executed. Since compiling has already been completed, an execution speed is increased from the next code.

To determine whether the initialization is completed, the control unit 110 may receive, from each of the OS and the application program, information about whether the initialization is completed and determine the completion thereof.

In operation 502, the control unit 110 suspends all peripheral devices such as USB or Bluetooth devices, so as to increase a booting speed by preventing additional initialization during fast booting using a boot image later. The peripheral devices to be suspended may be, for example, a network device such as an Ethernet device, or a USB device. Also, in the case of the image forming apparatus 2, a device such as a fax machine, a scanner, or a printer may be suspended. Also, the control unit 110 may store information about a state of a peripheral component interconnect (PCI) of the image forming apparatus 2.

In operation 503, the control unit 110 completes unnecessary device drivers of drivers in execution due to suspension of the peripheral devices.

In operation 504, the control unit 110 stops a process of an application program to be stored in a boot image among the initialized application programs, so as to prevent malfunction generated when the process of an application program continues during the generation of a boot image.

In operation 505, the control unit 110 terminates a process that is not used for the execution of the OS and the application program among the processes in execution when the initialization of the OS and the application program is completed. For example, in the case of a Linux OS, the control unit 110 terminates processes such as samba, ssh, telnet, etc, so as to reduce the size of a boot image to be generated. Also, for a process using a file, since information that a file is open is stored, the process is prevented from referring to wrong file information during fast booting using a boot image. For the image forming apparatus 2, a process in charge of firmware (F/W) update or a process for storing a log for development may be terminated.

Also, the control unit 110 may terminate another process that is not used for a job of generating a boot image. Furthermore, the control unit 110 may terminate a process whose operation time is not greater than a predetermined critical value, among the processes executed when the initialization of the OS and the application program is completed. The predetermined critical value corresponds to a value that may be changed according to a setting by a user.

In operation 506, the control unit 110 unmounts at least one of a filesystem used for the terminated process and a filesystem that is not used for the job of generating a boot image. In other words, the control unit 110 unmounts all filesystems that are not used by the processes in execution. For the image forming apparatus 2, when user information, account information, history information, etc. are used, all the pieces of information are unmounted and thus the filesystem may be safely maintained when a boot image is stored.

In operation 507, the control unit 110 initializes a space of the non-volatile memory 220 where a boot image is to be stored. For example, the control unit 110 may initialize a particular partition of the non-volatile memory 220 to store a boot image in the particular partition. In detail, the control unit 110 initializes a memory space that has been maintained without being freed after use in the non-volatile memory 220. In particular, when middleware such as Java is used, unnecessary data remaining in the non-volatile memory 220 may be removed using garbage collection. As such, when the control unit 110 initializes the space where a boot image is to be stored, more memory space may be secured for fast booting. Thus, since a sufficient memory space may be secured in advance without performing garbage collection, a degradation of system performance may be prevented.

The control unit 110 initializes the non-volatile memory 220 into a plurality of partitions. The reason for dividing the non-volatile memory 220 into a plurality of partitions is because, if there is only one partition, when the boot image is generated, all information of a filesystem may be stored in a boot image. This may cause a problem that information of files stored in a boot image and information about files of the filesystem do not match with each other. The control unit 110 stores data that is changeable and data that is not changeable in different partitions. In the case of the image forming apparatus 2, the unchangeable data may correspond to a general OS and F/W data. Also, in the image forming apparatus 2, the changeable data may include data such as job history information, account information, a user's address book, and OS data, such as an IP address, that may be changed by a user.

In operation 508, the control unit 110 suspends all processes being executed by the image forming apparatus 2.

In operation 509, the boot image generation unit 120 generates a boot image based on the information about a system state stored in the volatile memory 210 while the processes in execution are suspended. In detail, when all processes are suspended in operation 508, the control unit 110 stores header information in the boot image storing space of the non-volatile memory 220, as a preliminary process for generating a boot image. When the above preparation for generating a boot image is completed, the boot image generation unit 120 generates a boot image based on all data of the volatile memory 210, register values of the processor 10 and CPU cache information, storing information about a system state.

In other words, the information about a system state included in a boot image includes data of the volatile memory 210 and data of CPU registers, which indicate information needed for booting the image forming apparatus 2 in a state in which the processes in execution are suspended.

In operation 510, the swapping unit 130 stores a generated boot image in the non-volatile memory 220. The swapping unit 130 may store the generated boot image in a particular file or a particular partition of the non-volatile memory 220.

Figure 6:
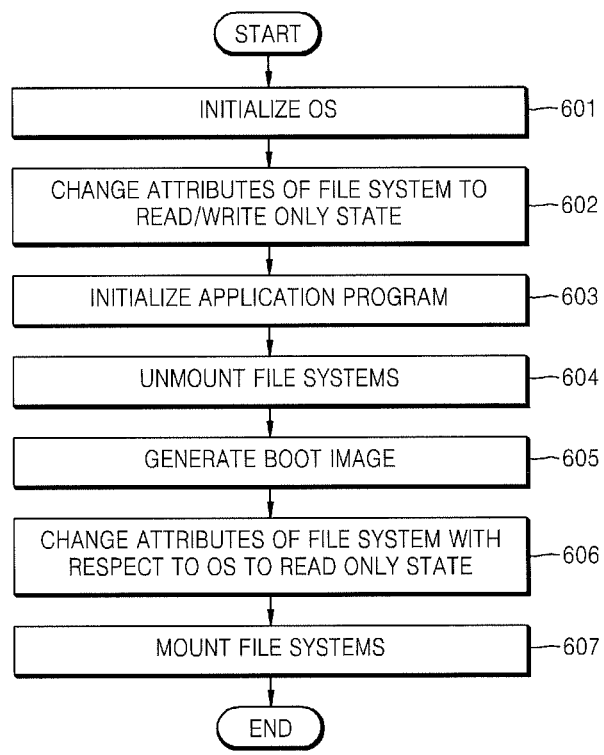
FIG. 6 is a flowchart for explaining, in detail, a method of changing attributes of a filesystem, according to an embodiment.

FIG. 6 is a flowchart for explaining, in detail, a method of changing attributes of a filesystem, according to an embodiment. FIG. 6 illustrates, in detail, operation 506 of FIG. 5 for unmounting a filesystem. Referring to FIG. 6, in operation 601, after the booting of the image forming apparatus 2 starts, the OS installed in the image forming apparatus 2 is initialized.

In operation 602, when the initialization of the OS is completed, the control unit 110 changes attributes of at least one filesystem to a read/write only state.

For example, according to an embodiment, the control unit 110 changes the attributes of all filesystems to a read/write only state. Then, the control unit 110 unmounts all filesystems in operation 604 below, so as to prevent a case in which the information of a filesystem stored in a boot image may be different from the information of a filesystem actually stored in the non-volatile memory 220.

Accordingly, a boot image to be generated may not store information about any filesystem. Thus, when fast booting using a boot image is performed, the filesystem is mounted again and information about a filesystem is newly loaded on the OS.

However, according to an embodiment, a filesystem, in which the information of a filesystem stored in a boot image cannot be different from the information of a filesystem actually stored in the non-volatile memory 220, may not be changed to a read/write only state or may not be unmounted.

In operation 603, the control unit 110 initializes at least one application program.

In operation 604, the control unit 110 unmounts the filesystem based on the changed attributes to a read/write only state. The control unit 110 first closes all files/sockets/databases open by the OS and the application program before unmounting the filesystem, so as to prevent a case in which the filesystem cannot be unmounted due to the open files/sockets/databases and to protect the safety of the filesystem, which is described below in detail with reference to FIG. 7. When the filesystem is unmounted, information about the filesystem opened by the OS and the application program is all erased and thus the filesystem is stored in a boot image in a state of not being present.

In operation 605, the boot image generation unit 120 generates a boot image.

In operation 606, when the generation of a boot image is completed, the control unit 110 changes to a read only state the attributes of a filesystem with respect to the OS among the filesystems whose attributes have been changed to a read/write only state.

In operation 607, the control unit 110 mounts the filesystems used by the OS and the application program and filesystems used in other processes.

In the above-description, a case in which the information of a filesystem stored in a boot image may be different from the information of a filesystem actually stored in the non-volatile memory 220 may occur, which is described below with reference to FIG. 7.

Figure 7:
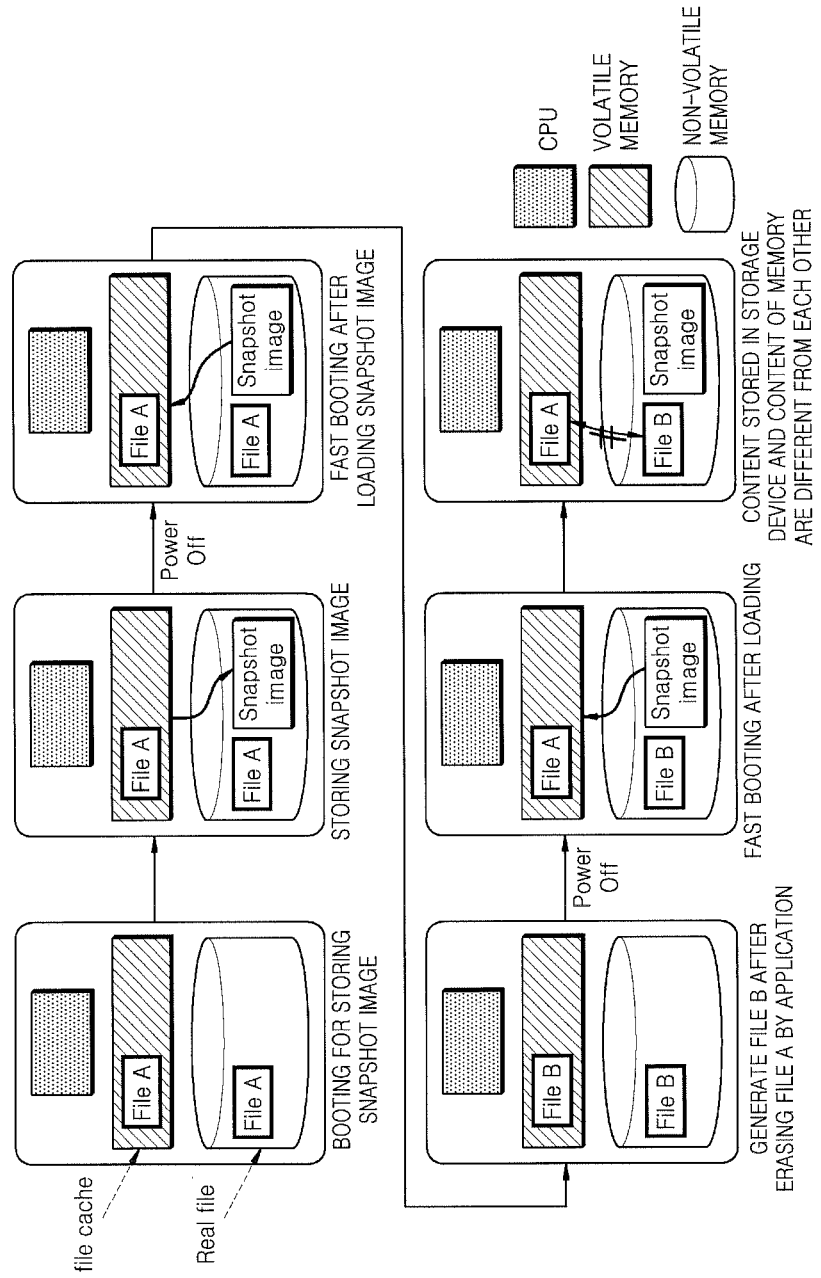
FIG. 7 schematically illustrates a case in which filesystem information stored in a boot image may be different from filesystem information actually stored in a non-volatile memory, according to an embodiment.

FIG. 7 schematically illustrates a case in which filesystem information stored in a boot image may be different from filesystem information actually stored in the non-volatile memory 220, according to an embodiment. Referring to FIG. 7, since a file A is stored in the volatile memory 210 when a boot image is generated, the file A is stored in the boot image. Then, when a user using an application program erases the file A and uses a file B, the file B, instead of the file A, is stored in the non-volatile memory 220. When the user performs fast booting using the boot image, since the file A is stored in the boot image, the application program tries to read the file A from the non-volatile memory 220. However, since the file B, instead of the file A, is stored in the non-volatile memory 220, the application program is not able to read the file A and thus malfunctions.

Thus, to prevent the malfunction, all filesystems or at least one particular filesystem is unmounted before the generation of a boot image.

Figure 8:
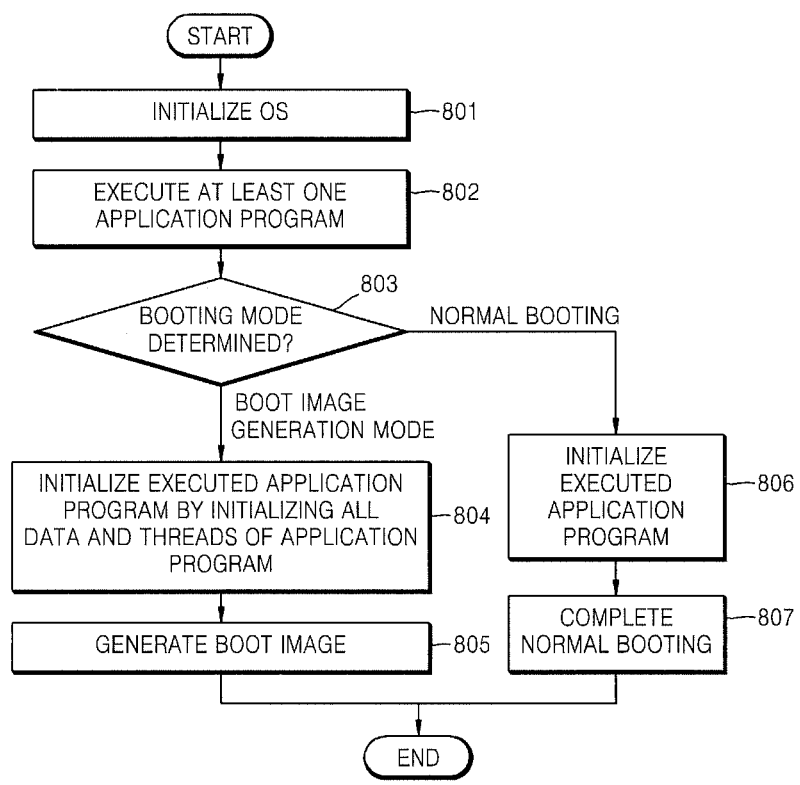
FIG. 8 is a flowchart for explaining, in detail, a process of initializing an application program, according to an embodiment.

FIG. 8 is a flowchart for explaining, in detail, a process of initializing an application program, according to an embodiment. FIG. 8 illustrates, in detail, the initialization of an application program in operation 501 of FIG. 5.

In operation 801, the control unit 110 initializes the OS installed in the image forming apparatus 2 after the booting of the image forming apparatus 2 starts.

In operation 802, when the OS is initialized, the control unit 110 executes at least one application program installed in the image forming apparatus 2.

In operation 803, the control unit 110 determines whether a booting mode is a boot image generation mode or normal booting. If the booting mode is a boot image generation mode, operation 804 is performed. Otherwise, if the booting mode is normal booting, operation 806 is performed.

In operation 804, since the booting mode is a boot image generation mode, the control unit 110 initializes an executed application program by initializing all data and threads of the executed application program. In other words, the control unit 110 initializes all data and threads of an application program as in the initialization during normal booting like cold booting.

In operation 805, the boot image generation unit 120 generates a boot image by using the initialized application program.

In operation 806, since the booting mode is normal booting, the control unit 110 initializes the executed application program.

In operation 807, the control unit 110 completes the normal booting of the image forming apparatus 2.

As such, according to an embodiment of FIG. 8, if a booting mode is a booting image generation mode, the control unit 110 initializes all data and threads of an application program before a boot image is generated.

However, when fast booting using a boot image is performed, a process of reinitialization of variable information of an application program is performed. The variable information signifies information including data and threads that may be changed by a user when using an application program. For the image forming apparatus 2, the variable information includes job history information, user account information, a system option set by a user, and documents saved by a user. The variable information is changed by a user after a boot image is generated and thus reinitialized after fast booting. In other words, as the variable information is read out again from the non-volatile memory 220 after fast booting, the information stored in a boot image is reinitialized. Otherwise, the information stored in a boot image is used as it is and thus a conflict may occur. However, since the variable information is initialized twice, unnecessary time may be used up.

Figure 9:
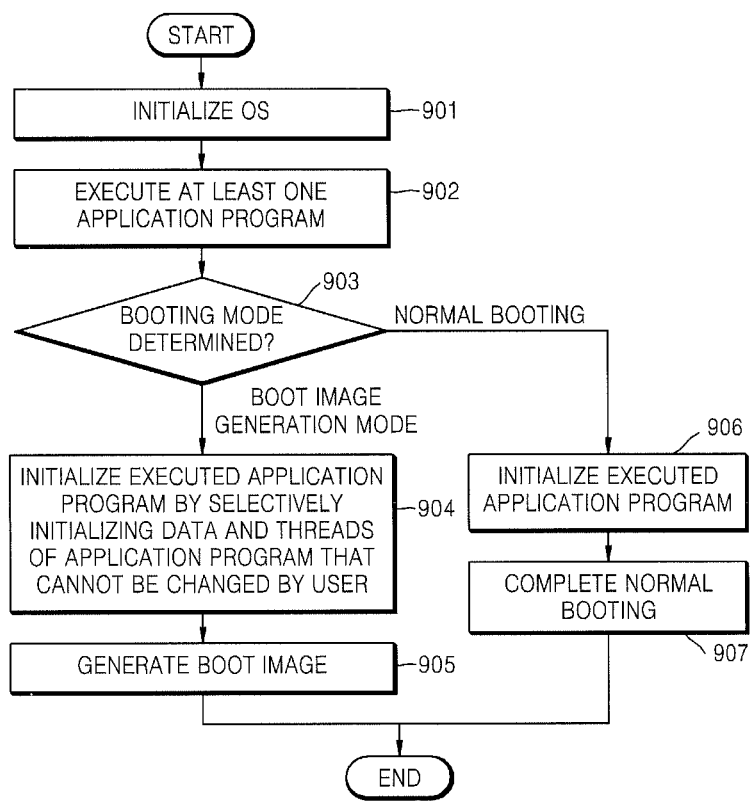
FIG. 9 is flowchart for explaining, in detail, a process of initializing an application program, according to an embodiment.

FIG. 9 is flowchart for explaining, in detail, a process of initializing an application program, according to an embodiment. Like FIG. 8, FIG. 9 illustrates, in detail, the initialization of an application program in operation 501 of FIG. 5. When comparing FIG. 9 with FIG. 8, all data and threads of an application program are not initialized.

In operation 901, the control unit 110 initializes the OS installed in the image forming apparatus 2 after the booting of the image forming apparatus 2 starts.

In operation 902, when the OS is initialized, the control unit 110 executes at least one application program installed in the image forming apparatus 2.

In operation 903, the control unit 110 determines whether a booting mode is a boot image generation mode or normal booting. If the booting mode is a boot image generation mode, operation 904 is performed. Otherwise, if the booting mode is normal booting, operation 906 is performed.

In operation 904, since the booting mode is a boot image generation mode, the control unit 110 initializes an executed application program by selectively initializing data and threads of the executed application program that cannot be changed by a user.

In operation 905, the boot image generation unit 120 generates a boot image by using the initialized application program.

In operation 906, since the booting mode is normal booting, the control unit 110 initializes the executed application program.

In operation 907, the control unit 110 completes the normal booting of the image forming apparatus 2.

As such, according to the embodiment of FIG. 9, when a booting mode is a booting image generation mode, the control unit 110 selectively initializes data and threads of an application program before a boot image is generated and thus the variable information may not be initialized twice. In other words, since the variable information is not initialized for the boot image generation but is initialized for fast booting, the time for generating a boot image may be reduced.

Referring back to FIG. 1B, the user interface unit 30 receives information from a user by using an information input device or informs a user of information processed by the image forming apparatus 2.

Figure 10:
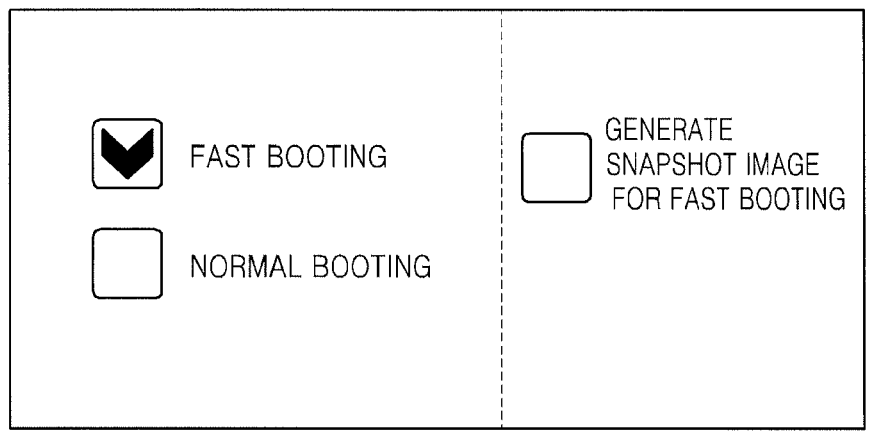
FIG. 10 schematically illustrates a screen image for selecting a booting mode displayed on a user interface unit, according to an embodiment.

FIG. 10 schematically illustrates a screen image for selecting a booting mode displayed on the user interface unit 30, according to an embodiment. As described above, the booting mode includes fast booting, normal booting, and a boot image generation mode. A user may select a booting mode on a screen as shown in FIG. 10 through the user interface unit 30.

Figure 11:
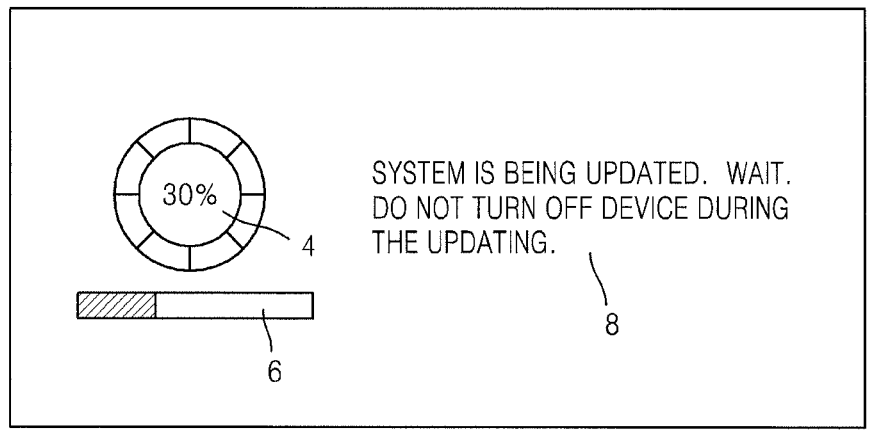
FIG. 11 schematically illustrates a screen image displayed on a user interface unit when a boot image is generated according to a boot image generation mode, according to an embodiment.

FIG. 11 schematically illustrates a screen image displayed on the user interface unit 30 when a boot image is generated according to a boot image generation mode, according to an embodiment. FIG. 11 illustrates a progress state of generating a boot image. In particular, the progress state may be indicated in a variety of forms such as a number4 such as percentage or a graph 6. Furthermore, the progress state may be indicated together with a message 8 to a user.

The configurations of screens of FIGS. 10 and 11 are merely embodiments, and one of ordinary skill in the art to which pertains would understand that the configurations may be modified into various forms.

In the above descriptions, the process of generating a boot image in the image forming apparatus 2 is discussed. A process of performing fast booting using a boot image generated by the image forming apparatus 2 is described below.

Figure 12:
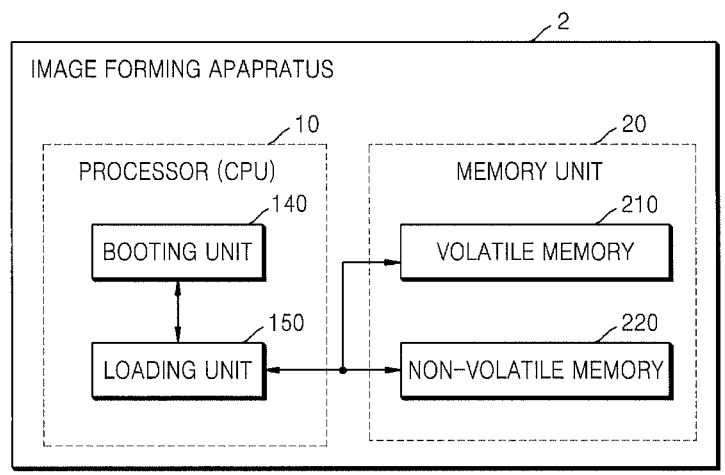
FIG. 12 is a block diagram schematically illustrating an image forming apparatus including a processor for performing fast booting by using a boot image, according to an embodiment.

FIG. 12 is a block diagram schematically illustrating the image forming apparatus 2 including the processor 10 for performing fast booting by using a boot image, according to an embodiment. Referring to FIG. 12, the image forming apparatus 2 includes the processor 10 and the memory unit 20 as illustrated in FIG. 1B. However, for convenience of explanation, other components are omitted in FIG. 12. Also, one of ordinary skill in the art would understand that only components related to the present embodiment of the components of the processor 10 shown in FIG. 10 are illustrated in FIG. 12.

The processor 10 includes a booting unit 140 and a loading unit 150. The memory unit 20, as described with reference to FIG. 1B, includes the volatile memory 210 and the non-volatile memory 220.

Figure 13:
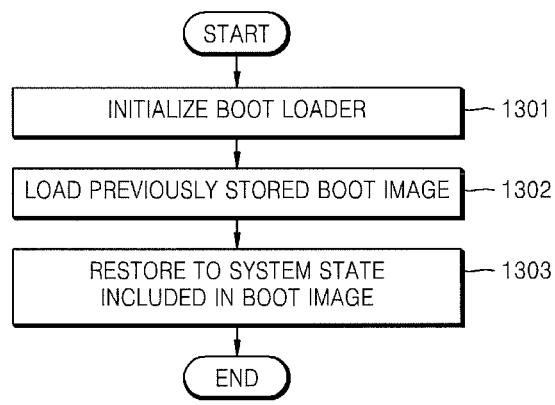
FIG. 13 is flowchart for explaining a method of performing fast booting of an image forming apparatus by using a boot image, according to an embodiment.

FIG. 13 is flowchart for explaining a method of performing fast booting of the image forming apparatus 2 by using a boot image, according an embodiment. Referring to FIG. 13, the fast booting method using a boot image is performed in a time series by the image forming apparatus 2 of FIG. 12. The fast booting method using a boot image is described below with reference to FIGS. 12 and 13.

In operation 1301, when power is applied to the image forming apparatus 2, the booting unit 140 starts booting of the image forming apparatus 2. In other words, the booting unit 140 initializes a boot loader.

In operation 1302, the loading unit 150 loads a boot image that is previously stored in the image forming apparatus 2. The boot image corresponds to the above-described boot image. In detail, the boot image includes information about a system state during when processes in execution in the image forming apparatus 2 are suspended after a process that is not used for the execution of an OS and at least one application program installed in the image forming apparatus 2 is suspended, among the processes executed when the initialization of the OS and the application program is completed, before the booting in operation 1301 starts.

In operation 1303, the booting unit 140 restores the image forming apparatus 2 to the system state included in a boot image based on the loaded boot image.

Figure 14:
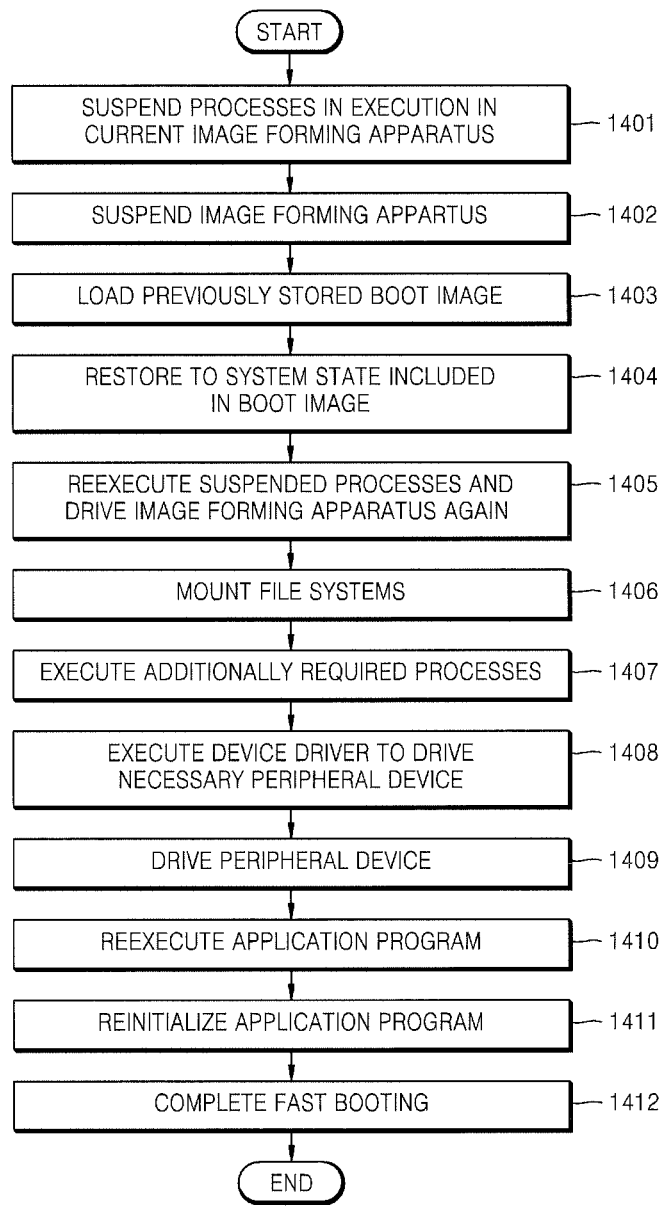
FIG. 14 is flowchart for explaining, in detail, a method of performing fast booting of an image forming apparatus by using a boot image, according to an embodiment.

FIG. 14 is flowchart for explaining, in detail, a method of performing fast booting of the image forming apparatus 2 by using a boot image, according to an embodiment. The fast booting method of FIG. 14 corresponds to a detailed version of the fast booting method of FIG. 13.

In operation 1401, when the booting mode is fast booting using a boot image, the booting unit 140 suspends processes in execution in the image forming apparatus 2.

In operation 1402, when the suspension of the processes is completed, the booting unit 140 controls the image forming apparatus 2 to be suspended. When the image forming apparatus 2 is suspended, peripheral devices such as a network device and a USB device of the image forming apparatus 2 are suspended together. Also, internal devices such as the printing unit, the facsimile unit, etc. of the image forming apparatus 2 may be suspended altogether.

The reasons for suspending the processes in operation 1401 and suspending the image forming apparatus 2 in operation 1402 are for preparing the processes for loading a boot image.

In operation 1403, the loading unit 150 loads the boot image previously stored in the non-volatile memory 220 on the volatile memory 210.

In operation 1404, the booting unit 140 restores the image forming apparatus 2 to the system state included in the boot image based on a loaded boot image.

In operation 1405, the booting unit 140 re-executes the suspended processes and drives the image forming apparatus 2 again.

In operation 1406, the booting unit 140 mounts the OS, the application program, and filesystems used for the re-executed processes. For example, the filesystem mounted in the image forming apparatus 2 includes a user's document, a user's address book, temporary print data, scan image data, etc. However, embodiments are not limited thereto and a filesystem for other user information may be mounted.

In operation 1407, the booting unit 140 executes additionally required processes. For example, for a Linux OS, the booting unit 140 may additionally execute processes such as samba or ssh. Also, a process of an application program for updating F/W of the image forming apparatus 2, a process of a program for storing user and development logs, and a process of a program directly installed by a user may be executed. However, when there is no process to be additionally executed, the booting unit 140 may skip operation 1407.

In operation 1408, the booting unit 140 executes a device driver to drive a peripheral device needed by the image forming apparatus 2. For example, the booting unit 140 executes a USB driver to drive a peripheral device such as a USB device. Also, for example, a driver communicating with the printing unit 42, the facsimile unit 44, and the scanning unit 46 of the image forming apparatus 2 is executed.

In operation 1409, the booting unit 140 drives a peripheral device according to the device driver executed in operation 1408. In other words, as described above, the booting unit 140 communicates with a peripheral device to check whether the peripheral device is initialized and is in an operation ready state and then drives a peripheral device. For example, the booting unit 140 drives the printing unit 42, the facsimile unit 44, and the scanning unit 46 of the image forming apparatus 2.

In operation 1410, the booting unit 140 re-executes the application program initialized and stored in the boot image.

In operation 1411, the booting unit 140 reinitializes the application program. The booting unit 140 may initialize data and threads that can be changed by a user, such as the above-described variable information of an application program. In detail, the variable information needing reinitialization is data that is changed by a user and a system and includes, for example, history information, count information, option information, etc. For the image forming apparatus 2, the variable information includes job history information and a user's usage history information, toner and tray information, network setting information, etc. Also, the variable information includes option information of an application program changed by a user, option information set by a user in a copy function, etc.

In operation 1412, the booting unit 140 completes fast booting of the image forming apparatus 2.

In the above-description, the process of performing fast booting using a boot image in the image forming apparatus 2 is discussed. When fast booting is performed using a boot image, unlike normal booting, the system state stored in the boot image is booted and thus a booting speed of the image forming apparatus 2 may be improved. In particular, for a system using middleware having a slow booting speed, a booting time is long. For example, for a system using middleware such as Java, a booting speed decreases compared to a system based on the C language. Furthermore, when a framework such as Spring framework is used for Java, although program development convenience and expandability may be provided, the booting speed may be severely decreased. When a system is booted by using a generated boot image according to the present embodiment, the booting speed or booting time may be improved as shown in Table 1.

Table 1 shows a comparison of activation times of functions between normal booting and fast booting in an MFP with an 800 Mhz ARM CPU and 512 MB RAM. The activation times in Tables 1 are mere examples for explaining the present embodiment and embodiments are not limited thereto.

TABLE 1

| Type | Copy screen display time | Printing ready time | Overall booting completion time |
|---|---|---|---|
| Normal booting (cold booting) | 3 min 40 sec | 5 min 30 sec | 10 min 20 sec |
| Fast booting using boot image | 1 min 10 sec | 1 min 10 sec | 2 min |

Referring back to FIG. 1B, a variety of software is installed in advance in the image forming apparatus 2. For example, F/W, an OS, and an application program are installed in the image forming apparatus 2. The software is stored in the non-volatile memory 220.

A user may try to change the software already installed in the image forming apparatus 2. For example, a user may update or upgrade a previous version of F/W installed in the image forming apparatus 2 to a new F/W version.

However, in the system in which a previous version of F/W is operated, pieces of data needed to execute the already installed previous version of F/W are stored in the non-volatile memory 220. Also, the image forming apparatus 2 is driven or booted by using the stored previous data.

When the image forming apparatus 2 is updated to a new F/W version, the data stored in the non-volatile memory 220 may be changed. Accordingly, since a previous version of a boot image generated under a system operated by a previous version of F/W may not use the changed data in the non-volatile memory 220, a problem may occur in executing the previous version of a boot image. In other words, in a system operated by a new F/W version, fast booting may not be performed using the previous version of a boot image. In this case, the previous version of a boot image may be updated to a new version of a boot image.

A process of updating a boot image when the previous version of F/W is updated to a new F/W version is described below.

Figure 15:
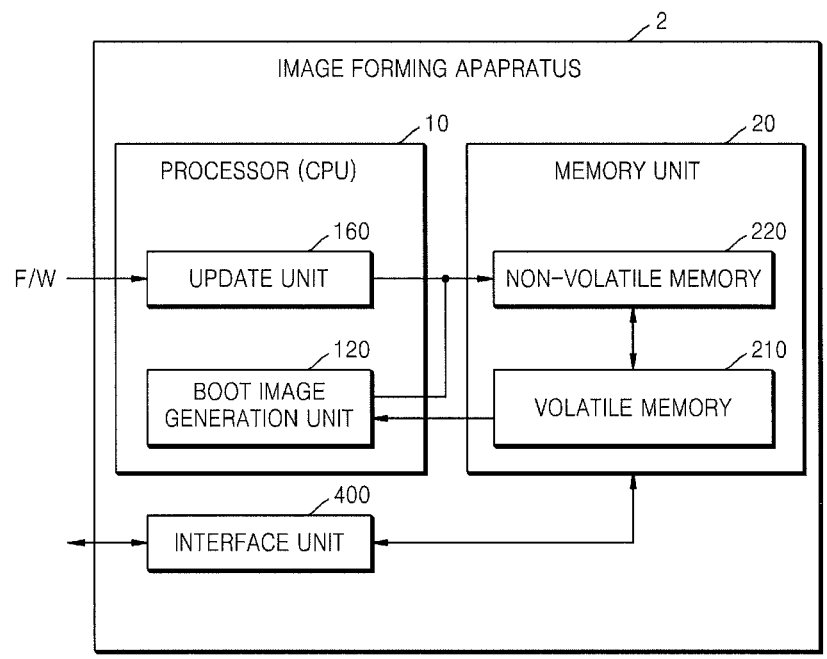
FIG. 15 is a block diagram schematically illustrating a structure of an image forming apparatus including a processor for updating a boot image, according to an embodiment.

FIG. 15 is a block diagram schematically illustrating a structure of the image forming apparatus 2 including the processor 10 for updating a boot image, according to an embodiment. In FIG. 15, only components of the image forming apparatus 2 that relate to an embodiment are illustrated while other component of the image forming apparatus 2 of FIG. 1B are omitted in the drawing. However, this is merely for convenience of explanation and one of ordinary skill in the art would understand that the other omitted components of the image forming apparatus 2 of FIG. 1B may be included in the image forming apparatus 2 of FIG. 15.

Referring to FIG. 15, the image forming apparatus 2 includes the processor 10, the memory unit 20, and an interface unit (interface) 400. The processor 10 includes the boot image generation unit 120 and an update unit 160.

The interface unit 400 receives a new F/W version to update the previous version of F/W installed in the image forming apparatus 2. The interface unit 400 performs the same function as that of the network interface unit 40 of FIG. 1B. In other words, like a wired/wireless LAN card, a USB port, and a Bluetooth module, the interface unit 400 is a unit performing a function of receiving F/W from an external network, external devices, etc.

Prior to the F/W update, as described above, the generated previous version of a boot image is stored in the non-volatile memory 220 of the memory unit 20. When fast booting is performed, the previous version of a boot image stored in the non-volatile memory 220 is loaded on the volatile memory 210 of the memory unit 20 and fast booting is performed.

However, when F/W is updated, other data related to other booting stored in the non-volatile memory 220 may be changed by the F/W update and thus the volatile memory 210 may normally perform fast booting by loading the previous version of a boot image.

The update unit 160 of the processor 10 first determines whether a new version of a boot image is included in the received new F/W version. Then, the update unit 160 performs an update according to a result of the determination.

When a new version of a boot image is included in the received new F/W version, the processor 10, in particular the update unit 160, updates the boot image by controlling the stored previous version of a boot image to be replaced by a new version of a boot image. In detail, when a new version of a boot image is included in the received new F/W version, the update unit 160 erases the previous version of a boot image stored in the non-volatile memory 220 and copies a new version of a boot image included in the received new F/W version to the non-volatile memory 220.

When the image forming apparatus 2 is a Linux system, it may be seen that the non-volatile memory 220 where the previous version of a boot image is stored is formatted in a swap form. Thus, like copying a general file, a new version of a boot image may be updated using a disk input/output program as follows:

"dd if=snapshot_file of=/dev/memory1"

Here, the "snapshot_file" is a binary file of a new version of a boot image to be used by the update unit 160 for updating and "/dev/memory1" is a non-volatile memory where the new version of a boot image is to be stored.

However, the above disk input/output program is exemplary. Thus, when the image forming apparatus 2 is embodied in a different type of a system or another disk input/output program is used, one of ordinary skill in the art would understand that the new version of a boot image may be updated or copied in a different method.

A new version of a boot image includes information indicating a system state in a booting process of a system of the image forming apparatus to be updated by a new F/W version. For example, a new version of a boot image may include information about the processes during the booting process or the settings of H/W of the image forming apparatus 2 that is updated by a new F/W version. Also, the new version of a boot image may include information about a filesystem related to new versions of an OS and an application program included in the new F/W version. For the image forming apparatus 2, a new version of a boot image may include information about a filesystem related to a new version of an application program related to an address book, a document box, etc.

When the update or upgrade to a new F/W version is performed, the systems of the image forming apparatus 2 before the F/W update and after the F/W update are not identical and thus fast booting may be normally performed later only when a boot image is newly regenerated. However, since the time for regeneration of a boot image is very long, a user may be inconvenienced and thus service costs may be increased.

However, the processor 10, in particular, the update unit 160, that updates a booting image according to the present embodiment erases the previous version of a boot image from the non-volatile memory 220 and copies a new version of a boot image included in a new F/W version to the non-volatile memory 220, thereby reducing the inconvenience of regenerating a booting image for the first time.

When the update unit 160 fails to update of a new boot image or to perform fast booting using an updated new boot image, the boot image generation unit 120 of the processor 10 regenerates a boot image by using the above-described process of generating a boot image for fast booting (refer to the descriptions of FIGS. 1A to 11).

Figure 16:
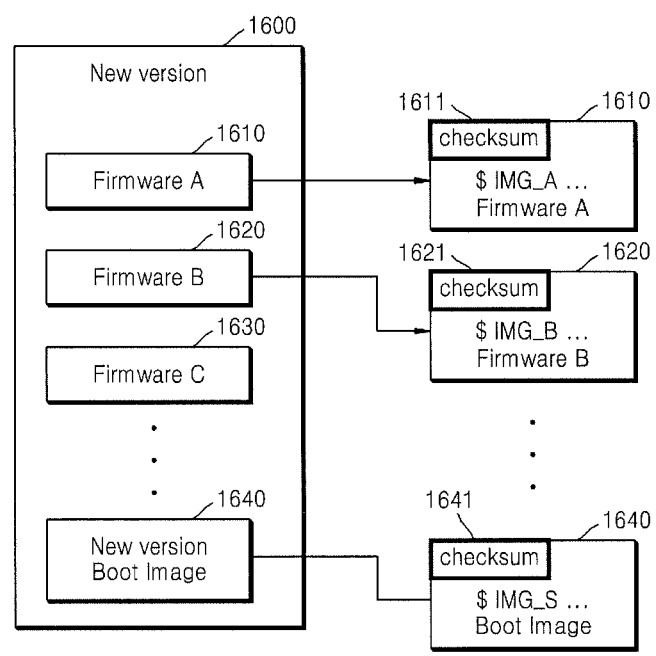
FIG. 16 illustrates firmware images included in a new version of firmware and new versions of boot images, according to an embodiment.

FIG. 16 illustrates firmware images included in a new F/W version 1600 and new versions of boot images, according to an embodiment. Referring to FIG. 16, a new F/W version 1600 includes F/W image A (Firmware A) 1610, F/W image B (Firmware B) 1620, F/W image C (Firmware C) 1630, and a new version of a boot image (New version Boot Image) 1640. The number of F/W images 1610, 1620, and 1630 are arbitrary.

The new F/W version 1600 is received through the interface unit 400.

The update unit 160 extracts the Firmware A, B, and C 1610, 1620, and 1630 and the new version of a boot image 1640 from the new F/W version 1600. Referring to FIG. 16, each of the Firmware A, B, and C 1610, 1620, and 1630 and the new version of a boot image 1640 includes a header "$IMG_..." for classifying image types. The update unit 160 extracts the Firmware A, B, and C 1610, 1620, and 1630 and the new version of a boot image 1640 by using the header.

The update unit 160 checks for an error in each of the Firmware A, B, and C 1610, 1620, and 1630 and the new version of a boot image 1640. The update unit 160 performs a F/W update or a boot image update by using an image that is found to have no error.

The update unit 160 may check for an error by using checksum of each of the Firmware A, B, and C 1610, 1620, and 1630 and the new version of a boot image 1640. Also, the update unit 160 may use other error checking methods that are already known to one of ordinary skill in the art.

For example, when there is no error as a result of checking checksums 1611, 1621, and 1641 of the Firmware A and B 1610 and 1620 and the new version of a boot image 1640, the update unit 160 updates F/W by using the Firmware A and B 1610 and 1620 and updates the boot image by using the new version of a boot image 1640. However, when there is an error as a result of checking the checksum 1641 of the new version of a boot image 1640, the update unit 160 may perform an update with the Firmware A, B, and C 1610, 1620, and 1630 only.

Furthermore, the update unit 160 may check a compatibility of each of the Firmware A, B, and C 1610, 1620, and 1630 and the new version of a boot image 1640, and perform an update by using an image that is found to have no problems in the compatibility with the image forming apparatus 2.

Consequently, for the update of a boot image, the update unit 160 erases the previous version of a boot image stored in the non-volatile memory 220 and copies the new version of a boot image 1640 to the non-volatile memory 220 to thereby complete the update of a boot image.

Figure 17:
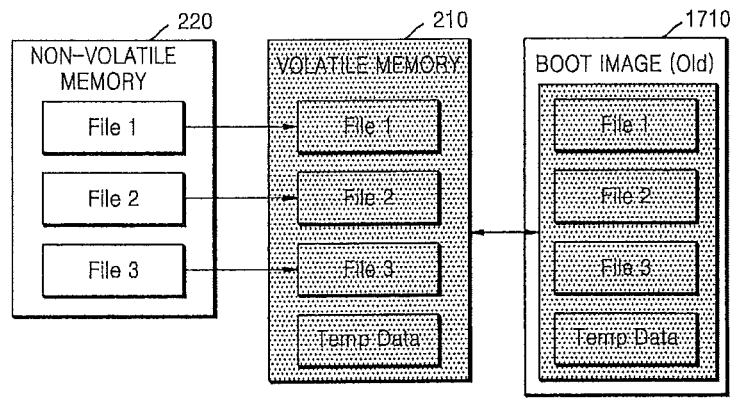
FIG. 17 illustrates a comparison between a system before a firmware update and a system after a firmware update, according to an embodiment.
Figure 17:
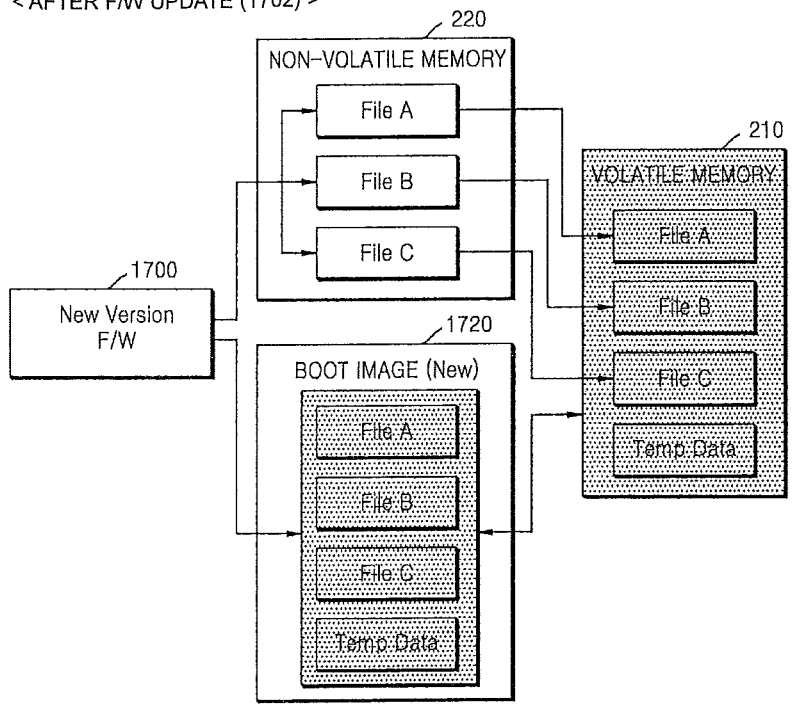

FIG. 17 illustrates a comparison between a system state of a before-F/W-update state 1701 and a system state of an after-F/W-update state 1702 of the image forming apparatus 2, according to an embodiment. Referring to FIG. 17, File 1, File 2, and File 3 are stored in the non-volatile memory 220 in the before-F/W-update state 1701. In the process of generating a boot image for fast booting (refer to the descriptions of FIGS. 1A to 11), the File 1, File 2, and File 3 of the non-volatile memory 220 are loaded on the volatile memory 210. A previous version boot image 1710 generated in the before-F/W-update state 1701 is generated based on the File 1, File 2, and File 3 and temporary data Temp Data loaded on the volatile memory 210.

After the after-F/W-update state 1702 obtained by a new version F/W 1700, the File 1, File 2, and File 3 stored in the non-volatile memory 220 are changed to (or replaced with) File A, File B, and File C, respectively. Accordingly, when fast booting is performed, not the File 1, File 2, and File 3 but the File A, File B, and File C are loaded on the volatile memory 210.

Thus, as described above, when fast booting is performed by using the previous version boot image 1710 in the after-F/W-update state 1702, the File 1, File 2, and File 3 of the previous version boot image 1710 are no longer stored in the non-volatile memory 220 and thus fast booting may not be performed.

The new version F/W 1700 includes a new version boot image 1720. The update unit 160 erases the previous version boot image 1710 from the non-volatile memory 220 and copies the new version boot image 1720 to the non-volatile memory 220 to thereby update a boot image. Accordingly, when fast booting is performed in the after-F/W-update state 1702, the File A, File B, and File C of the new version boot image 1720 that are the same as the File A, File B, and File C that are stored in the non-volatile memory 220 in the after-F/W-update state 1702 are loaded on the volatile memory 210 and thus fast booting may be normally performed.

Referring back to FIG. 15, when fast booting is performed by using the replaced new version boot image after the F/W update is completed and fast booting fails by as many times as a threshold number of times, the processor 10 performs normal booting by switching the current mode to the above-described normal booting mode. Furthermore, when fast booting fails by as many times as the critical number of times by using the new version boot image, the processor 10 erases the new version boot image and regenerates a boot image through the process of generating a boot image for fast booting (refer to the descriptions of FIGS. 1A to 11). The critical number of times may be arbitrarily set according to a user's use environment.

The user interface unit 30 of the image forming apparatus 2 provides a user with information about the processes of updating a boot image or F/W and receives a command about the update processes from the user. For example, the user interface unit 30 may display to a user information about an option or information about a progress state of the boot image update or F/W update. Also, the user interface unit 30 may receive from a user commends needed for updating, such as a command about a start of the boot image update or F/W update, a command about selection of a F/W image or a boot image to be used for update, or a command about switching to a normal booting mode.

Figure 18:
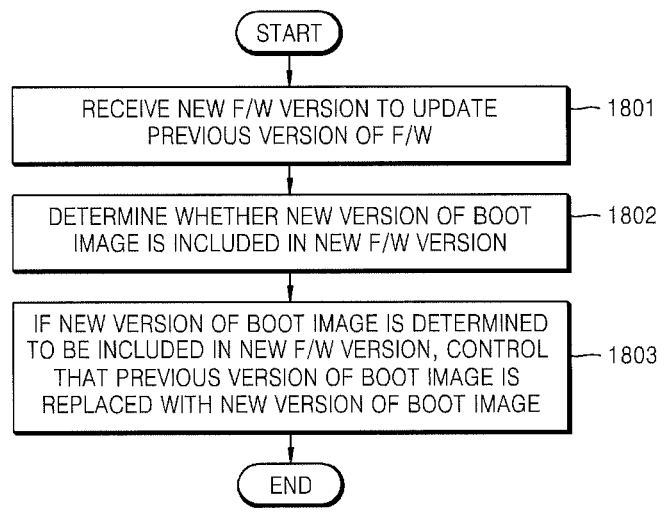
FIG. 18 is a flowchart for explaining a method of updating a boot image for fast booting of an image forming apparatus, according to an embodiment.

FIG. 18 is a flowchart for explaining a method of updating a boot image for fast booting of the image forming apparatus 2, according to an embodiment. Referring to FIG. 18, the method of updating a boot image, according to the present embodiment, includes operations processed in a time series in the image forming apparatus 2 of the above-described figures. Thus, although omitted in the following description, the contents described above with respect to the image forming apparatus 2 apply to the method of updating a boot image, according to an embodiment.

In operation 1801, the interface unit 400 receives a new F/W version to update the previous F/W version installed in the image forming apparatus 2.

In operation 1802, the processor 10 determines whether a new version of a boot image to update the previous F/W version stored in the non-volatile memory 220 is included in the received new F/W version.

In operation 1803, if it is determined that a new version of a boot image is included in the received new F/W version, the processor 10 updates a boot image by controlling that the previous version of a boot image is replaced with the new version of a boot image. In doing so, the processor 10 erases the previous version of a boot image stored in the non-volatile memory 220 and copies the new version of a boot image to the non-volatile memory 220.

Figure 19:
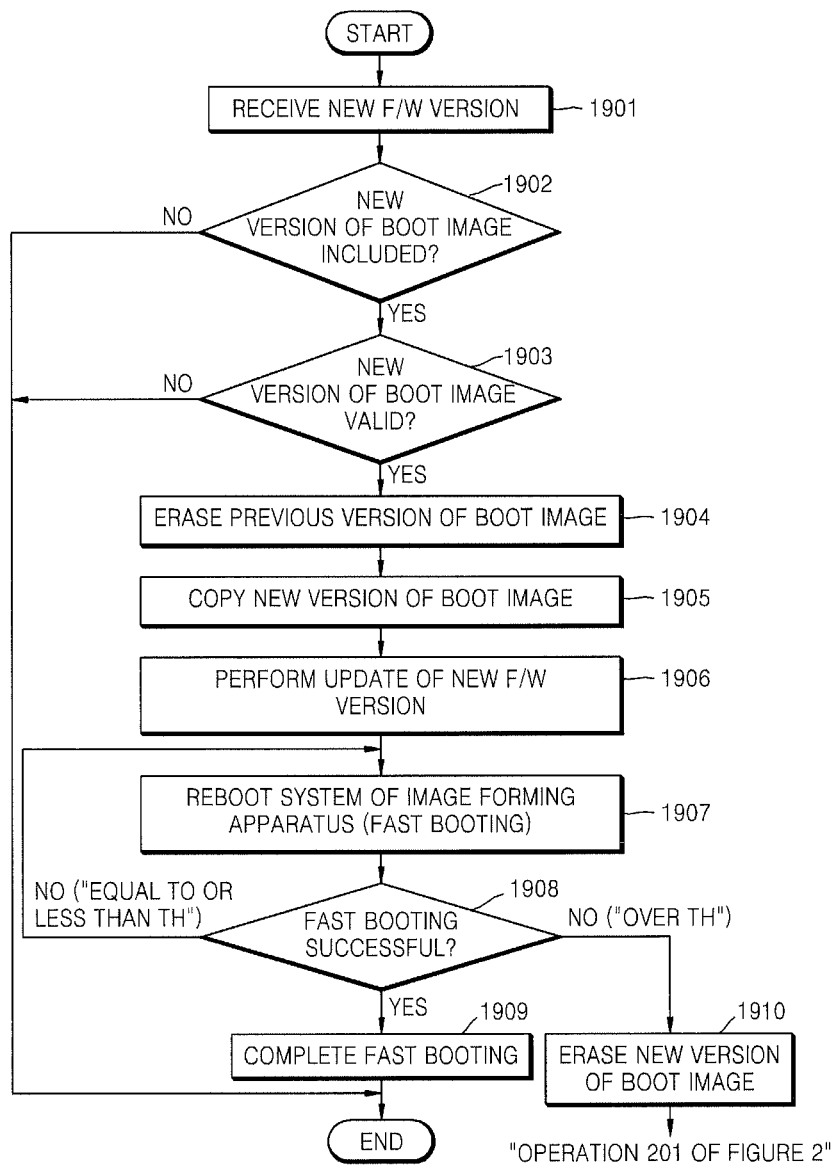
FIG. 19 is a flowchart for explaining a method of performing fast booting with an updated boot image after updating a boot image for fast booting of an image forming apparatus, according to an embodiment.

FIG. 19 is a flowchart for explaining a method of performing fast booting with an updated boot image after updating a boot image for fast booting of the image forming apparatus 2, according to an embodiment. The method of updating a boot image that is partially illustrated in FIG. 19 corresponds to the method of updating a boot image of FIG. 18.

In operation 1901, the interface unit 400 receives a new F/W version to update the previous version of a boot image installed in the image forming apparatus 2.

In operation 1902, the processor 10 determines whether a new version of a boot image to update the previous version of a boot image stored in the non-volatile memory 220 is included in the received new F/W version. If a new version of a boot image is included in the received new F/W version, the processor 10 performs operation 1903. Otherwise, the process 10 terminates the update of a boot image. Even when the update of a boot image is terminated, the F/W update may be performed as a separate process.

In operation 1903, the processor 10 checks whether there is an error in the new version of a boot image or whether the new version of a boot image is compatible with the image forming apparatus 2. If there is no error in the new version of a boot image and the new version of a boot image is compatible with the image forming apparatus 2, the process 10 performs operation 1904. Otherwise, the processor 10 terminates the update of a boot image. Even when the update of a boot image is terminated, the F/W update may be performed as a separate process.

In operation 1904, the processor 10 erases the previous version of a boot image stored in the non-volatile memory 220.

In operation 1905, the processor 10 copies on the non-volatile memory 220 a new version of a boot image to replace the previous version of a boot image, which is included in the new F/W version. Thus, the update of a boot image may be completed.

In operation 1906, the processor 10 performs an update of a new F/W version.

In operation 1907, the processor 10 reboots the system of the image forming apparatus 2 so that the image forming apparatus 2 may be operated in a system with updated F/W. In doing so, the image forming apparatus 2 may perform fast booting by using an updated new version of a boot image.

In operation 1908, the processor 10 determines whether fast booting succeeded by using the new version of a boot image.

If fast booting succeeded by using the new version of a boot image, the processor performs operation 1909.

However, if the fast booting using the new version of a boot image fails by the number of times that is equal to or less than a critical number of times TH, the processor 10 performs operation 1907 again to reboot the system of the image forming apparatus 2.

However, if the fast booting using the new version of a boot image fails by the number of times beyond the critical number of times TH, the processor 10 performs operation 1910.

In operation 1909, the processor 10 completes the fast booting and thus the processes of updating a boot image and booting the image forming apparatus 2 are completed.

In operation 1910, the processor 10 erases the new version of a boot image. Then, the processor 10 performs operation 201 of FIG. 2A and regenerates a boot image in the system of the image forming apparatus 2 that is updated to the new F/W version.

As described above, even when F/W installed in an electronic product is updated or upgraded, a booting speed of the electronic product may be improved by software without a change in hardware of the electronic product by performing fast booting by using a boot image. Thus, the electronic product may be efficiently used as the booting time decreases or the booting speed increases. In particular, since a new version of a boot image is included in a new F/W version, even when F/W is updated or upgraded, a user may not be inconvenienced by regenerating a boot image.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While embodiments been particularly shown and described with reference to embodiments thereof, it will be understood by one of ordinary skill in the art that various changes in form and details may be made therein without departing from the spirit and scope of the disclosure as defined by the appended claims.

What is claimed is:

1. A method of updating a boot image for fast booting of an image forming apparatus, the method comprising:
   receiving a new version of firmware to update a previous version of firmware installed in the image forming apparatus;
   determining whether the received new version of firmware includes a new version of a second boot image for the fast booting to update a previous version of a first boot image for the fast booting stored in a non-volatile memory; and
   if the received new version of firmware includes the second boot image, updating the boot image by controlling the stored first boot image to be replaced with the second boot image,
   wherein each of the first boot image and the second boot image for the fast booting corresponds to an image file including data of a system state in a process of booting a system of the image forming apparatus,
   wherein, in a boot image generation mode in the image forming apparatus, the new version of the second boot image is generated by initializing an executed application including selectively initializing data and threads of the executed application which cannot be changed by any user before generation of the new version of the second boot image, and
   wherein, in a normal booting mode in the image forming apparatus, initializing the executed application and completing the normal booting mode without generating the new version of the second boot image.

2. The method of claim 1, wherein the second boot image includes information indicating a system state in a process of booting a system of the image forming apparatus to be updated by the new version of firmware.

3. The method of claim 1, wherein the updating of a boot image comprises:
   erasing the first boot image stored in the non-volatile memory; and
   copying the second boot image to the non-volatile memory.

4. The method of claim 1, further comprising checking whether each of the second boot image and at least one firmware image included in the received new version of firmware has an error or is compatible with the image forming apparatus,
   wherein, in the updating of a boot image, the firmware or the boot image is updated by using an image that is found to have no error or be compatible with the image forming apparatus.

5. The method of claim 1, further comprising extracting the second boot image from the received new version of firmware,
   wherein, in the updating of a boot image, the boot image is updated by replacing the first boot image with the extracted second boot image.

6. The method of claim 1, further comprising:
   performing the fast booting with the replaced second boot image; and
   if the fast booting fails by as many times as a critical number of times as a result of performing the fast booting, switching the boot image generation mode to the normal booting mode and performing normal booting.

7. The method of claim 6, further comprising:
   if the fast booting fails by as many times as the critical number of times, erasing the replaced second boot image; and
   regenerating a boot image for the fast booting.

8. At least one non-transitory computer-readable recording medium storing computer readable instructions that control at least one processor for executing the method of claim 1.

9. An image forming apparatus for updating a boot image for fast booting, the image forming apparatus comprising:
- an interface to receive a new version of firmware to update a previous version of firmware installed in the image forming apparatus;
- a non-volatile memory to store a previous version of a first boot image for the fast booting; and
- a processor to update the boot image by controlling the stored first boot image to be replaced with a new version of a second boot image for the fast booting when the received new version of firmware includes the second boot image,
- wherein each of the first boot image and the second boot image for the fast booting corresponds to an image file including data of a system state in a process of booting a system of the image forming apparatus,
- wherein, in a boot image generation mode in the image forming apparatus, the new version of the second boot image is generated by initializing an executed application including selectively initializing data and threads of the executed application which cannot be changed by any user before generation of the new version of the second boot image, and
- wherein, in a normal booting mode in the image forming apparatus, initializing the executed application and completing the normal booting mode without generating the new version of the second boot image.

10. The image forming apparatus of claim 1, wherein the second boot image includes information indicating a system state in a process of booting a system of the image forming apparatus to be updated by the new version of firmware.

11. The image forming apparatus of claim 1, wherein the processor determines whether the received new version of firmware includes the second boot image and performs the update according to a result of the determination.

12. The image forming apparatus of claim 11, wherein, when it is determined that the received new version of firmware includes the second boot image, the processor erases the stored first boot image and copies the second boot image to the non-volatile memory.

13. The image forming apparatus of claim 1, wherein the processor checks whether each of the second boot image and at least one firmware image included in the received new version of firmware has an error, and performs the update by using an image that is found to have no error.

14. The image forming apparatus of claim 13, wherein the processor checks the error by using checksum of each of images included in the received new version of firmware.

15. The image forming apparatus of claim 1, wherein the processor checks a compatibility of each of at least one firmware image and the second boot image that are included in the received new version of firmware, and performs the update by using an image that is found to have no error in compatibility with the image forming apparatus.

16. The image forming apparatus of claim 9, wherein the processor extracts the second boot image from the received new version of firmware and performs the update by using the extracted second boot image.

17. The image forming apparatus of claim 1, wherein, when the fast booting fails by as many times as a critical number of times as a result of performing the fast booting with the replaced second boot image, the processor switches boot image generation mode to the normal booting mode and performs normal booting.

18. The image forming apparatus of claim 17, wherein, when the fast booting fails by as many times as the critical number of times, the processor erases the replaced second boot image and regenerates a boot image for the fast booting.

19. The image forming apparatus of claim 1, further comprising a user interface providing the user with information about processes of performing the update.

* * * * *